United States Patent
Schmid et al.

(10) Patent No.: US 6,735,291 B1
(45) Date of Patent: May 11, 2004

(54) VIRTUAL PRIVATE SWITCHED TELEPHONE NETWORK

(75) Inventors: Greg Schmid, San Antonio, TX (US); Keith S. Pickens, San Antonio, TX (US); Craig Heilmann, San Antonio, TX (US)

(73) Assignee: SecureLogix Corporation, San Antonio, TX (US)

( * ) Notice: Subject to any disclaimer, the term of this patent is extended or adjusted under 35 U.S.C. 154(b) by 51 days.

(21) Appl. No.: 09/709,592

(22) Filed: Nov. 10, 2000

Related U.S. Application Data

(63) Continuation-in-part of application No. 09/210,347, filed on Dec. 11, 1998.

(51) Int. Cl.[7] ............................................. H04M 3/00
(52) U.S. Cl. ..................... 379/189; 379/199; 379/200
(58) Field of Search ........................... 379/112.39, 219, 379/221.15, 189, 198, 901, 199, 200

(56) References Cited

U.S. PATENT DOCUMENTS

| 5,490,212 A | * | 2/1996 | Lautenschlager ............ 379/225 |
| 5,946,386 A | | 8/1999 | Rogers et al. ............... 379/265 |
| 6,098,172 A | | 8/2000 | Coss et al. ................... 713/201 |
| 6,226,751 B1 | * | 5/2001 | Arrow et al. ................ 713/201 |

OTHER PUBLICATIONS

The Official Dictionary of Telecommunications, Networking and the Internet (17th ed., Feb. 2001), Harry Newton. (pp. 718, 751, 752, and 759).

* cited by examiner

*Primary Examiner*—Bing Bui
(74) *Attorney, Agent, or Firm*—Jenkins & Gilchrist, PC

(57) ABSTRACT

A system and method to provide secure access across the untrusted PSTN is described. The system and method utilizes telephony resources that can be initiated by a security policy defining actions to be taken based upon at least one attribute of the call, providing multi-tiered policy-based enforcement capabilities and visibility into security events.

20 Claims, 25 Drawing Sheets

US 6,735,291 B1

VIRTUAL PRIVATE SWITCHED TELEPHONE NETWORK

CROSS-REFERENCE TO RELATED APPLICATIONS

This application is a continuation-in-part of U.S. patent application Ser. No. 09/210,347 entitled TELEPHONY SECURITY SYSTEM filed Dec. 11, 1998, and is related to U.S. patent application Ser. No. 09/457,494 entitled A TIGHTLY INTEGRATED COOPERATIVE TELECOMMUNICATIONS FIREWALL AND SCANNER WITH DISTRIBUTED CAPABILITIES filed Dec. 8, 1999, both assigned to the assignee of the present application and incorporated by reference in their entireties.

TECHNICAL FIELD

The invention relates generally to telecommunications access control systems and more particularly, to a system and method whereby a virtual private telephone network is autonomously constructed between at least two in-line devices.

BACKGROUND OF THE INVENTION

Historically, government and business entities could be reasonably confident that their sensitive information communicated by telephone, fax, or modem was confidential, and that no one would monitor or eavesdrop on their plans and strategies. This is no longer true. In the past several years, information assets have become increasingly vulnerable to interception while in transit between the intended parties, as interception and penetration technologies have multiplied.

A wide range of communications, from those concerning military, government, and law enforcement actions, to contract negotiations, legal actions and personnel issues all require confidentiality, as do communications concerning new-product development, strategic planning, financial transactions or any competition-sensitive matter. They often require discussions over the telephone, faxes, videoconferences, data transmission and other electronic communication. As businesses depend on their communications systems more and more, those systems are delivering ever-greater volumes of information, much of it proprietary and extremely valuable to competitors.

It's not just business competitors that companies have to be concerned about. Risks are particularly high for businesses with operations outside the United States. Many nations are defining their national security as economic security, and they're putting their intelligence agencies into the business of industrial and economic espionage. Some foreign intelligence agencies actively and aggressively spy on businesses to collect technology and proprietary information.

The increasing prevalence of digital communications systems has led to the widespread use of digital encryption systems by governments and businesses concerned with communications security. These systems have taken several forms, from data Virtual Private Networks (VPN), to secure voice/data terminals.

Communications and computer systems move massive amounts of information quickly and routinely. With voice, fax, data and video to choose from, businesses are communicating in all these modes via the untrusted Public Switched Telephone Network (PSTN). Unfortunately, whereas a data VPN protects information traveling over the Internet, a data VPN is not designed to protect voice, fax, modem, and video calls over the untrusted PSTN.

While IP-based VPN technology is automated and widely available, solutions for creating safe tunnels through the PSTN are more manual, requiring user participation at both ends to make a call secure. Such is the case with the use of secure voice/data terminals, such as Secure Telephone Units (STU-IIIs), Secure Telephone Equipment (STE), and hand-held telephony encryption devices.

When used, secure voice/data terminals effectively protect sensitive voice and data calls. However, their design and typical deployment can be self-defeating. For example, to enter secure mode on a STU-III or STE device, both call parties must retrieve a physical encryption key from a safe storage location and insert it into their individual device each time a call is placed or received. Also, STU-III and STE devices are expensive, so they are typically located within a department or work center, but not at each work station. If a STU-III or STE call is not scheduled ahead of time, the caller may have to wait while the person they are calling is brought to the phone—with a key.

If the secure voice/data terminal is installed on an analog line, transmission speed and voice recognition quality is low. Slow speed may be tolerated for secure data transfer, but it can make secure voice communication difficult and frustrating. Good speed and voice quality is attainable on ISDN or T-1 lines, but replacement of analog lines is expensive and many organizations prefer to keep their existing equipment.

The inconvenience, frustration, and poor voice quality of using manually activated secure voice/data terminals can motivate individuals to "talk around" the sensitive material on non-secure phones. Although the confidential information is not directly spoken, these vague conversations can be pieced together to get a fair idea of the information that was supposed to be protected. Use of secure voice/data terminals for the communication of sensitive information can be mandated by policy, but there is no way to properly enforce such a requirement.

Additionally, secure voice/data terminals secure only one line per device. As point-to-point devices, secure voice/data terminals cannot protect the vast majority of calls occurring between users who do not have access to the equipment. And while there are policies that specifically prohibit it, sensitive material can be inadvertently discussed on non-secure phones and distributed across the untrusted PSTN.

Secure voice/data terminals cannot implement an enterprise-wide, multi-tiered policy-based enforcement of a corporate security policy establishing a basic security structure across an enterprise, dictated from the top of the tier downward. Neither can secure voice/data terminals implement an enterprise-wide, multi-tiered policy-based enforcement of selective event logging and consolidated reporting to be relayed up the tier.

Secure voice/data terminals cannot provide the capability of "live" viewing of all secure call actions performed by the device.

Lastly, secure voice/data terminals cannot provide call event logs, detailing secure calls. Therefore, a consolidated detailed and summary report can not be produced for use by security personnel and management in assessing the organization's security posture.

Clearly, there is a need for a system and method to provide secure access across the untrusted PSTN through telephony resources that can be initiated by a security policy defining actions to be taken based upon at least one attribute of the call, providing multi-tiered policy-based enforcement capabilities and visibility into security events.

SUMMARY OF THE INVENTION

A system and method to provide secure access across the untrusted PSTN is described. The system and method utilizes telephony resources that can be initiated by a security policy defining actions to be taken based upon at least one attribute of the call, providing multi-tiered policy-based enforcement capabilities and visibility into security events.

Some advantages of the system and method are: its completely operator-transparent; its less expensive; it does not require static secret keys—creates a new key each session; it does not require manual keys; it's a secure transport of modem, fax, and voice; its unaffected by transcoding; there is a separate message channel from the data so the message and data can be sent concurrently; there is automatic policy enforcement; the policy is implemented by call type and it accommodates a multi-tier policy enforcement.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIGS. 18A and 18B show a process flow diagram illustrating the decryption and decompression process.

DETAILED DESCRIPTION OF THE PREFERRED EMBODIMENTS

The present invention can be described with several examples given below. It is understood, however, that the examples below are not necessarily limitations to the present invention, but are used to describe typical embodiments of operation.

Figure 1A:
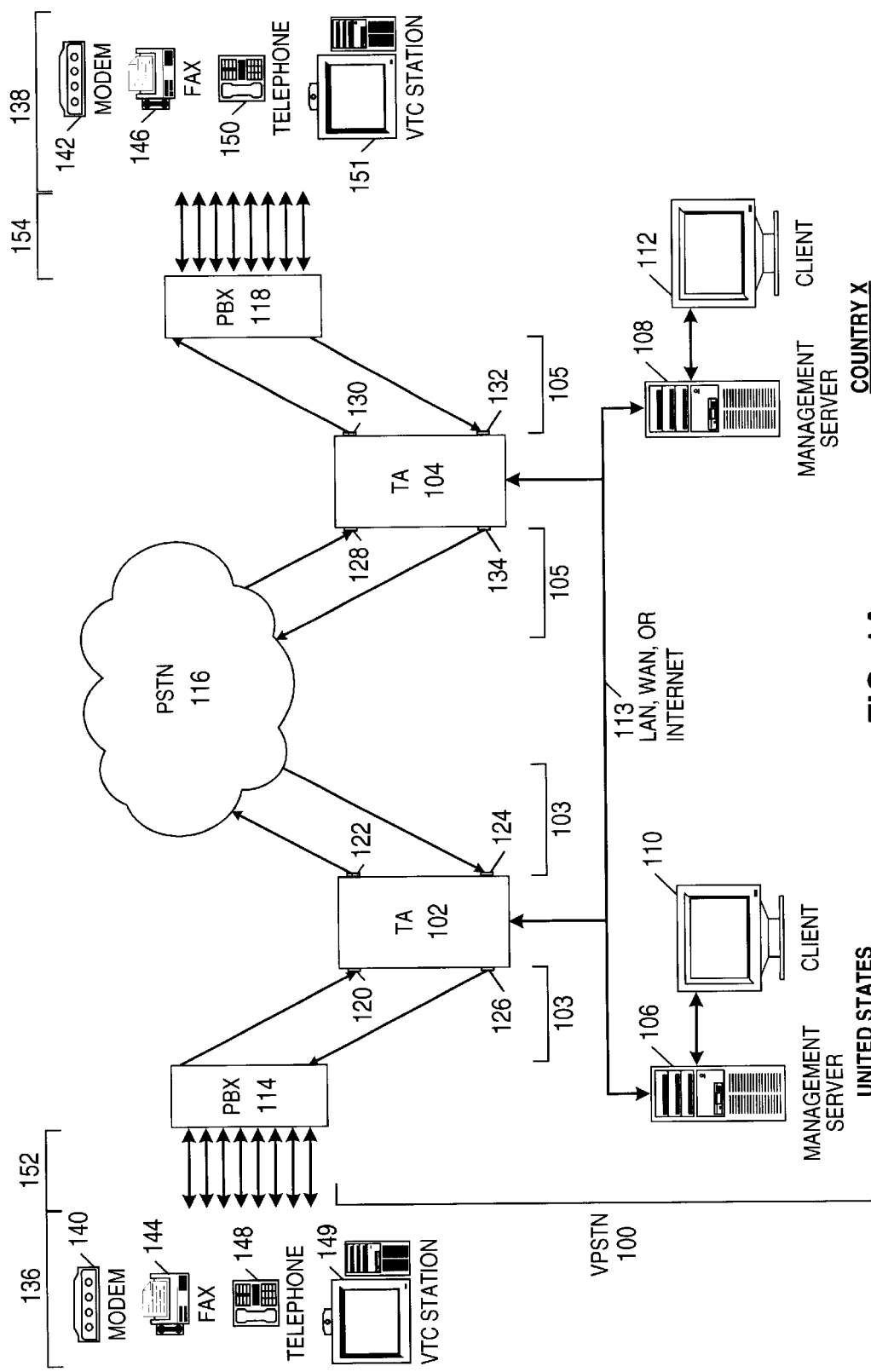
FIG. 1 is a schematic drawing of an exemplary telecommunications Virtual Private Switched Telephone Network (VPSTN) 100 of the present invention.
Figure 1B:
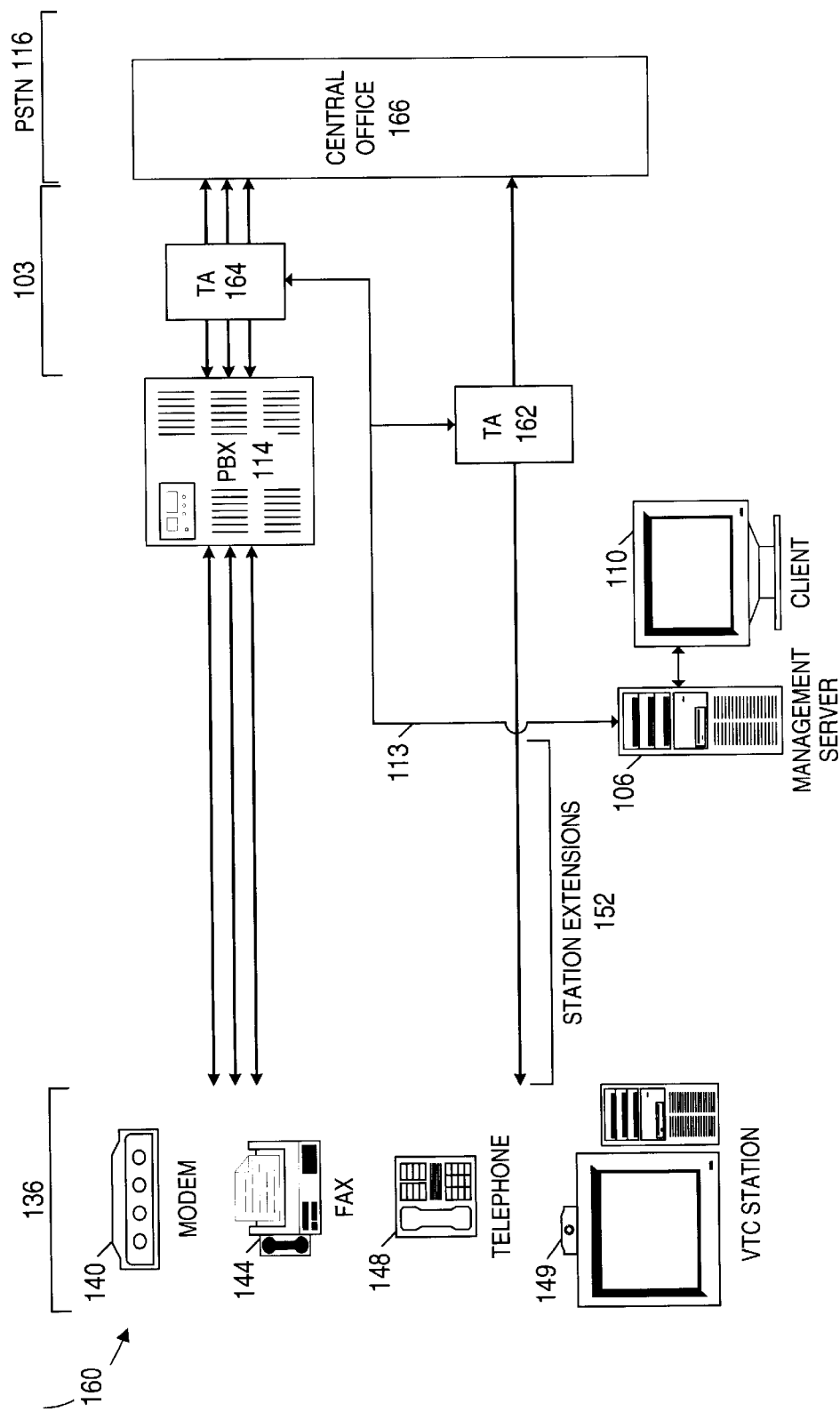

FIG. 1 is a schematic block diagram of an exemplary telecommunications Virtual Private Switched Telephone Network (VPSTN) 100 of the present invention, similar to the telecommunications firewall implemented as shown and described in U.S. patent application Ser. No. 09/210,347. VPSTN 100 can be combined with the telecommunications firewall to act as a VPSTN 100 and a firewall simultaneously, or to result in a mixture of capabilities of each device.

VPSTN 100 includes a plurality of Telephony Appliances (TA) 102 and 104, management servers 106 and 108, and clients 110 and 112, all interconnected by a Local Area Network (LAN), Wide Area Network (WAN) or the Internet for interaction as described below.

The VPSTN 100 provides secure communication between two geographically separate, even globally distributed locations. The TA 102 or 104 is installed in-line on a Digital Signal level 1 (DS-1) circuit. The capacity (quantity and speed of channels) on a DS-1 varies relative to global location. For instance, a T1 or J1 circuit, used in North America and Japan respectively, operates at 1,544,000 bits per second (bps) and carries 24 time-division-multiplexed (TDM) DS-0 channels. Additionally, in North America, an Integrated Services Digital Network Primary Rate Interface (ISDN PRI) circuit may carry either 23 TDM DS-0 channels with one signaling channel, or 24 TDM DS-0 channels. In Europe, an E1 circuit operates at 2,048,000 bps and carries 30 TDM DS-0 channels in addition to 2 signaling channels. A DS-0 channel operates at 64,000 bps, [the worldwide standard speed for digitizing one voice conversation using Pulse Code Modulation (PCM) and sampling the voice 8,000 times per second and encoding the result in an 8-bit code (8×8000=64,000 bps)]. An additional variation relative to global location is the difference in the form of PCM encoding. Typically, mu-law is the standard used in North American and Japanese telephone networks, and A-law is used in European networks. Transcoding, or modifying the data stream from mu-law to A-law so that it can be carried via a different network may cause the PCM value to change. Regardless of whether the circuit type (T1, J1, ISDN PRI, E1, etc.) that connects the VPSTN 100 with the PSTN is the same on both sides of the PSTN (i.e., T1 to PSTN to T1, as may occur with calls conducted within North America), or is some combination of circuit types (i.e., T1 to PSTN to E1, as would occur with an international call), all operations are transparent to the individuals placing and receiving the call.

The TA 102 is installed in-series on a DS-1 span between a Public Branch eXchange (PBX) 114 and a Public Switched Telephone Network (PSTN) 116. The TA 104 is installed in-series on the DS-1 span between the PSTN 116 and a PBX 118. The TA 102 has two input and two output ports, specifically, a PBX-in port 120, a PSTN-out port 122, a PSTN-in port 124, and a PBX-out port 126. Similarly, the TA 104 has two input and two output ports, specifically, a PSTN-in port 128, a PBX-out port 130, a PBX-in port 132, and a PSTN-out port 134.

The client 110 and 112 is a point of user-interface for configuring a security policy, displaying and viewing real-time alerts, viewing real-time event logs, printing event logs and consolidated reports, and other operational features of the VPSTN 100.

A security policy is a sequential listing of rules that define whether certain calls to or from an extension will be allowed, denied (hung-up), conducted in secure mode, monitored for content, logged, and if other actions such as sending a warning tone or message, or sending notifications by real-time alerts, pager or email are required.

The management server 106 and 108 receive the security policy and push a copy of the security policy to the TA 102 and 104 respectively. The TA 102 and 104 receive the security policy, and as appropriate, monitor incoming and outgoing calls, allow, deny, or otherwise manipulate calls, including conducting calls in secure mode, all in accordance with the security policy and based on a plurality of call attributes, including call content-type (voice, fax, modem, VTC, etc.).

Also in FIG. 1, numerals 136 and 138 designate end-user stations, representing as examples, one or more modems 140 and 142, fax machines 144 and 146, and telephones 148 and 150, which may send or receive calls over the VPSTN 100.

The modems 140 and 142 may be connected to a desktop or portable personal computer. Individual extensions 152 and 154 connect the end-user stations 136 and 138 to the PBX 114 and 118 respectively.

For clarity and simplicity of explanation, FIG. 1 and subsequent figures show a complete DS-1 circuit (specifically, all 32 DS-0 channels on an E1) connected between the TA 102, the PSTN 116 and the TA 104, although typically, the DS-0 channels that make up the DS-1 trunk may be individually switched by the PSTN 116 to different locations relevant to call destination. All of the DS-0 channels on the DS-1 are shown to be processed using the present invention, although a security policy can be configured such that the present invention is selectively applied based on call attributes such as source and destination number, call content type, etc. Additionally, in the examples provided, voice is the media transported although the present invention also provides secure transport for a plurality of media in addition to voice, such as least fax, modem and VTC.

Additionally, the system and method supports a multi-tiered security policy. For example, a corporate-dictated security policy will contain basic rules for the Security Rule database. These rules are classified as either "Required" or "Optional". Each level of the hierarchical environment must adhere to a required rule, but can choose to ignore optional rules. Each level of the tier is capable of making their local rules and the rules for the tiers below it more stringent than the corporate-dictated rules, but can not make the rules more lax. In this way, a basic security structure is ensured across the enterprise.

The corporate-dictated security policy contains basic security rules that dictate what information will be reported upward, thereby providing visibility into only the most important local security events at the corporate level. Just as the corporate-dictated rules send security guidelines that may become more stringent as they are passed downward, the policy institutes an information filter that becomes more selective as email, logs and reports, etc., are routed upward. The tasks in the "Tracks" column of the corporate-dictated rule (such as email notification, pager notification, logging of events, etc.), that are of interest at a local level but are not of interest at higher levels, are designated to be filtered out if notification of a rule firing is to be routed up the tier. All logging is real-time, both at the location where the event occurs and at upper levels of the organization that, in accordance with the security policy, may or may not require notification of the event.

Figure 2:
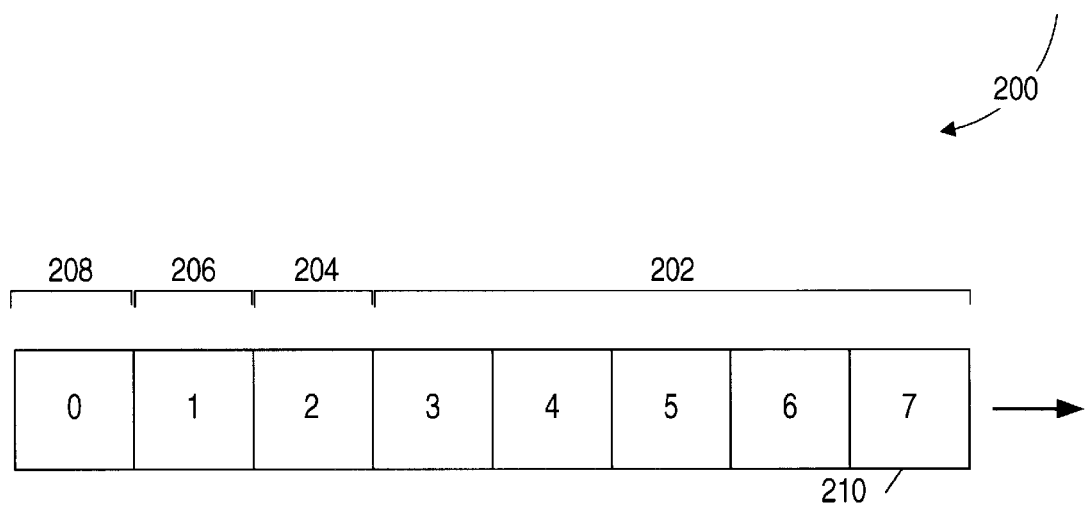
FIG. 2 is a schematic block diagram of a VPSTN DS-0 sample 200.

FIG. 2 is a schematic block diagram of a VPSTN DS-0 sample 200 of the present invention. The DS-0 is the atomic level (the lowest level) of a standard telephone call, regardless of whether the call is voice, fax, modem or VTC). As previously mentioned, the DS-0 operates at 64,000 bps. The present invention subdivides the VPSTN DS-0 sample 200 into three subrate channels. The term subrate is used because each of the three channels operate below the full DS-0 rate of 64,000 bps. The three subrate channels include a bearer channel 202, a Encrypted Packet (EP) boundary channel 204, and a message channel 206. The bearer channel 202 operates at a DS-0 subrate of 40,000 bps (5-bits per sample). The EP boundary channel 204 and message channel 206 each operate at a subrate of 8,000 bps (1-bit per sample). The three subrate channels add up to a rate of 56 (40+8+8) Kbps. The remaining 8 Kbps, is used for a Least Significant Bit (LSB) 208 position. The LSB 208 is set high during transmission and is discarded after it is received.

The three subrate channels are assigned bit positions within each VPSTN DS-0 sample sample 200. The bearer channel 202 is assigned bit positions 3, 4, 5, 6, and 7. The EP boundary channel 204 is assigned bit position 2, and the message channel 206 is assigned bit position 1.

The bearer channel 202 carries the audio signal in a compressed format. The ITU-T G.726 Recommendation [Adaptive Differential Pulse Code Modulation (ADPCM)] in 5-bit mode is used to compress the audio signal. In 5-bit mode (which operates at 40K bps), the voice quality is equal to that of an uncompressed Pulse Code Modulated (PCM) DS-0 at 64 Kbps (toll quality). The 5-bit ADPCM mode was designed specifically to allow voice-band data modems to be transported using ADPCM at modem speeds greater than 4800 baud. The ITU has conducted extensive tests and found that 5-bit ADPCM G.726 allows voice-band data modems to operate at speeds up to 19,200 baud. Therefore, using the VPSTN 100 may cause a V.90 or V.34 modem to connect at a slower speed than would be possible on a DS-0 not using the VPSTN 100. Moreover, because Group 3 fax transmissions operate at speeds less than 19,200 baud, using the VPSTN 100 should not impact fax transmission speeds.

The EP boundary channel 204 is used to create encryption packets made up of five 64-bit words (blocks). A 64-bit block size allows a 64-bit encryption/decryption engine to process the 64-bit blocks. An encryption packet of five 64-bit blocks are 8 milliseconds in length ($\frac{1}{125}$ of a second). The EP boundary is not relative to framing, such as the D3/D4 or ESF framing performed by the PSTN.

The message channel 206 is used to send messages between the TA 102 and 104. An extensible protocol such as the IETF's Session Initiation Protocol (SIP) is used to send ASCII text-based message packets over the 8,000 bps channel in alignment with the encryption packet boundary established for the bearer channel 202. Messages are used to setup a secure call, exchange and negotiate TA capabilities, exchange encryption keys, report errors, and control the call session. The message channel 206 remains active throughout the duration of a call, and is used to initiate or discontinue secure mode while a call is in progress. The 64-bit message packet may be subdivided into fields. The fields may contain the packet header, TA identification, message sequence numbers, timestamps, checksums, etc.

The LSB 208 of the VPSTN DS-0 sample 200 is discarded on receive channels and set high (1) on transmit channels. The LSB 208 data is not used because the PSTN 116 may cause some LSB 208 values to change during transport. Changes in the value of the LSB 208 can be caused by robbed-bit signaling, transcoding (mu-law to A-law to mu-law), or digital Packet Assembler/Disassembler (PAD) circuits.

Figure 3:
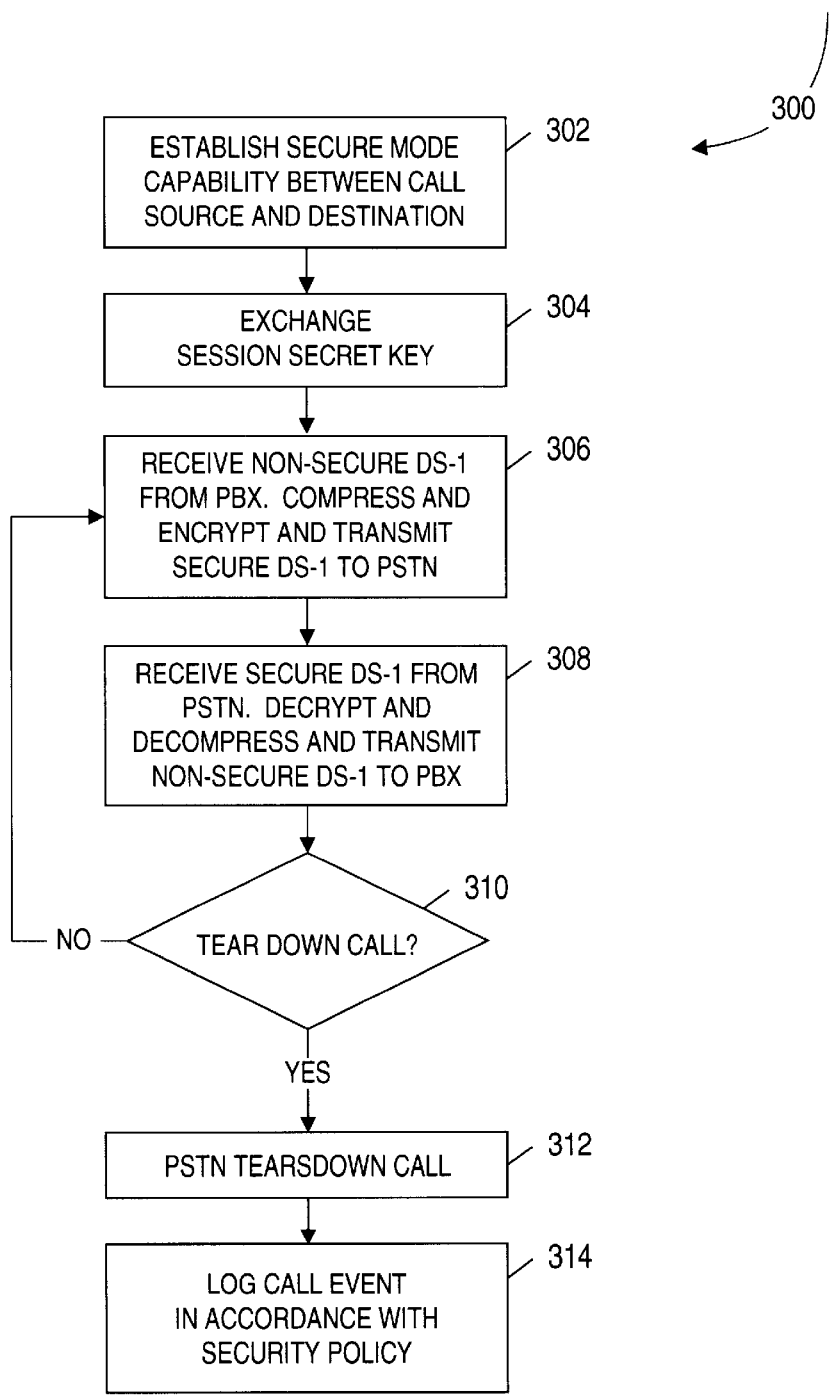
FIGS. 3–4 are flowcharts of portions of the method of one embodiment.

FIG. 3 is a process flow diagram illustrating the VPSTN process 300 whereby a voice call is conducted in secure mode. Imagine the following example. The President of a bank in the United States places a call from the telephone 148, to the Comptroller of the bank's branch office in "Country X", who receives the call on the telephone 150. The corporate security policy held by the TA 102 includes the following rule: "Encrypt all outgoing voice, fax, modem and VTC traffic, from all extensions, at any time, on any day, to destination numbers in the Country X group. If call can not be made secure, allow the call, play a warning message, email notification and log the call." Adherence to this rule is required. Since the failure to secure a call is an indication of the security posture, it is of interest to the upper echelon. As notification of the failure to conduct the secure call is made at each upper level of the hierarchy, the system logs the event for report generation, but filters the task of email notification from the upper level. The system generates email notification of the failure to secure the call and sends it only to local and Country X security personnel (call source and call destination).

The VPSTN 100 autonomously sets up and conducts a secure audio call, transparent to both the President initiating the call and the Comptroller receiving the call. In accordance with the security policy, the VPSTN 100 logs the event, and generates alerts or notifications as required.

In step 302, (reference will also be made to the elements within FIG. 1 for this example) the PSTN 116 uses the normal, non-secure telecommunications processes for connecting two terminals (phone sets). When the rule requiring secure communication with the Country X phone number fires, the TA 102 contacts the TA 104 to establish whether and under what conditions the call between the two locations can be conducted in secure mode.

The session's secret key is exchanged between the TA 102 and the TA 104 in step 304. A unique secret key, generated for each session by the call-originating TA, is exchanged and used by both the TA 102 and 104 for encryption and decryption of each direction's bearer channel 202. The exchange of the session secret key is performed using Public Key Exchange (PKE) on the message channel 206. Steps 302 and 304 take place in less than three seconds. During that time, the TA 102 plays a tone or some other audio message to the phone sets, and is heard by both parties involved with the call.

In step 306, the PBX-in port 120 receives the non-secure DS-1 from the PBX 114. The TA 102 manipulates, compresses and encrypts the non-secure data bit stream, thereby generating the secure VPSTN DS-0 sample 200 bit stream. The PSTN-out port 122 transmits the secure DS-1 to the PSTN 116, where it is switched to the PBX 118.

In step 308, the PSTN-in port 128 receives the secure VPSTN DS-0 channels from the PSTN 116. The TA 104 manipulates, decrypts and decompresses the secure data stream, thereby restoring the non-secure DS-0 data stream that was previously compressed and encrypted in step 306. The PBX-out port 130 transmits the non-secure DS-1 data stream to the PBX 118, which transmits the signal to the telephone 150.

While not shown, it is understood that the VPSTN 100 is capable of operating in a continuous loop, synchronously handling the flow of both the receiving and transmitting DS-0 channels. The process loop continues until the call is "hung up". The PSTN 116 tearsdown the call using the normal telecommunications processes for disconnecting the two phone sets, as shown in steps 310 and 312.

In step 314, the call event is logged, and any other actions required by the security policy, such as generation of notifications are executed.

Figure 4A:
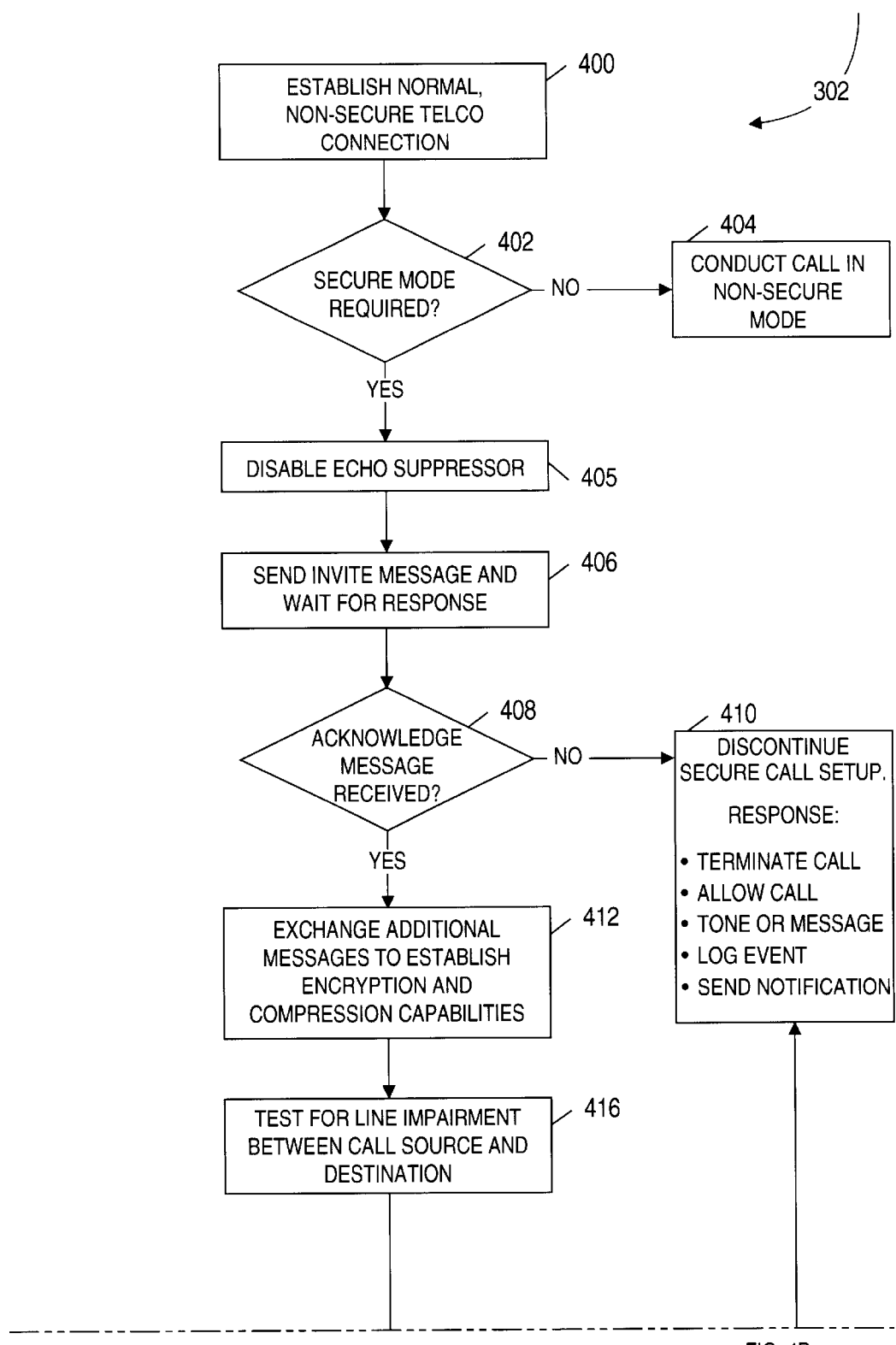
Figure 4B:
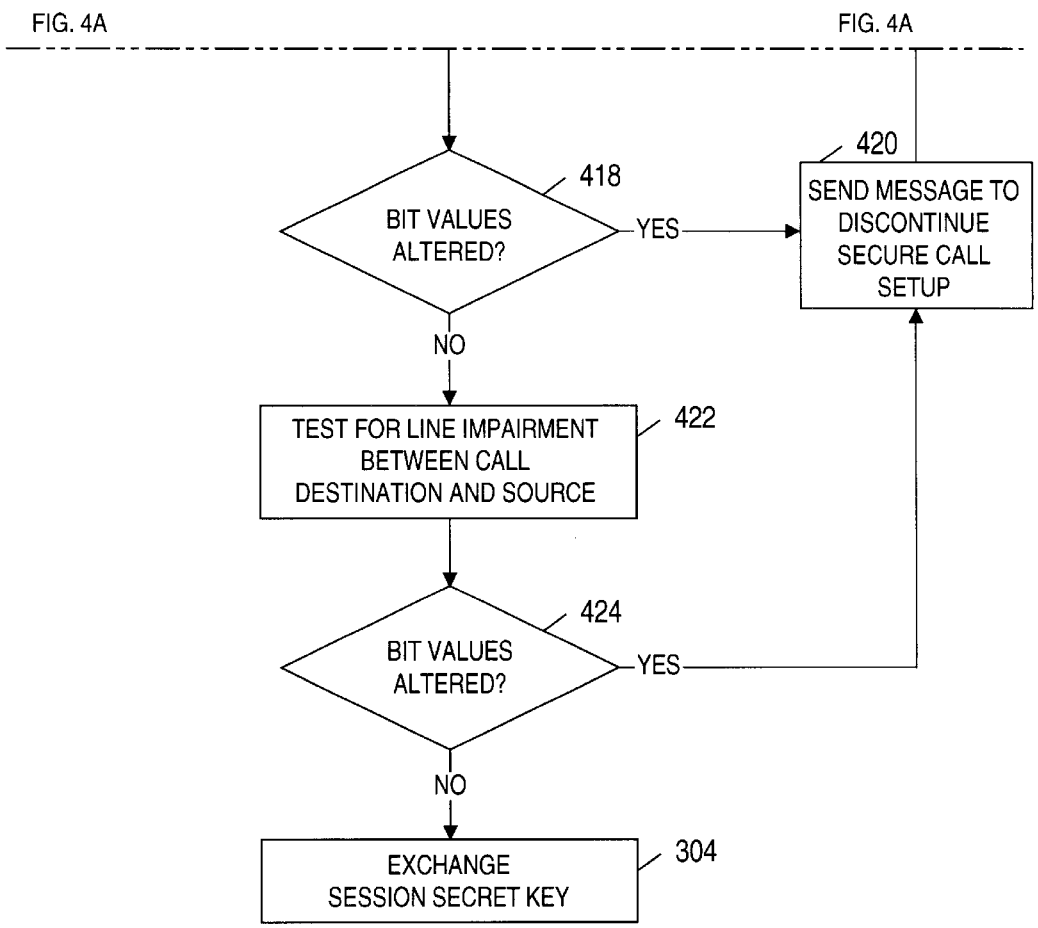

FIGS. 4A and 4B show a process flow diagram illustrating the secure call setup process 302 (of FIG. 3) whereby secure mode capabilities between the call source and destination are established prior to exchange of the session secret key. In step 400, (reference will also be made to the elements in FIG. 1 for this flowchart) an audio connection is established between the telephone 148, PBX 114, PSTN 116, PBX 118, and telephone 150 in the normal, non-secure method used for connecting two phone set on the PSTN 116. Once the audio connection is established, two non-secure DS-0 channels flow in a full duplex manner between the two phone sets.

In step 402, if a security rule requiring the call to be conducted in secure mode does not fire, the call continues to be conducted in the normal, non-secure method used by the PSTN 116, as described in step 404. If in step 402, at least one call attribute (such as source number, destination number, call content-type, time of call, etc.) fires a security rule that requires the call to be conducted in secure mode, the TA 102 responds accordingly to setup a secure call with the TA 104.

In step 406, shortly after audio establishment between the two telephones 148 and 150, the TA 102 sends a SIP "invite" message packet over the message channel 206 to the TA 104, and waits for a response. The invite message indicates that the TA 102 is attempting to initiate a secure call with the TA 104. The invite message also indicates the capabilities of the TA 102, such as compression and encryption options.

In step 408, if the TA 104 is not VPSTN-capable, the TA 102 times-out while waiting for an acknowledge message from the TA 104. If the TA 102 times-out in step 408, the TA 102 discontinues the secure call setup process 302, and respond to the failure to setup a secure call.

In step 410, the security policy may require one or more of the following responses by the TA 102 and management server 106 if the secure call setup process 302 is discontinued: terminate the call; allow the call to continue in non-secure mode; provide a warning tone or message indicating to the call parties that the call is not secure; log the event; or send notifications to appropriate personnel at the call source and destination.

If the TA 104 is VPSTN-capable, it receives the SIP invite message and sends a SIP "acknowledge" message over the transmit message channel 206 in step 408.

In step 412, additional message packets are exchanged to coordinate capabilities such as the encryption algorithm and compression algorithm that should be used for this session.

In step 414, the TA 102 disables the PSTN echo suppressor. The echo suppressor must be disabled because it hinders full duplex transmission of data. Full duplex transmission is necessary for encrypted data blocks to be synchronously transmitted and received by both the TA 102 and 104. The TA 102 sends a message packet to the TA 104 to indicate that a echo suppressor disabler tone (typically equal to 2025 Hz), will be generated over the DS-0 for the next x seconds. When the TA 102 receives an acknowledge message from the TA 104, the TA 102 sends the disabler tone.

After the disabler tone playback period, the TA 102 and TA 104 exchange messages to determine the line impairments of the two DS-0 channels flowing between the TA 102 and 104 in step 416. The TA 102 sends a "known" frame over the bearer channel 202, the content of which is known by both the TA 102 and 104. For example, the known frame may consist of a sequential count of 0 through 63. The TA 104 compares the received "known" with an unmodified known frame and determines if line impairments changed some of the bearer channel "known" frame bit values along the way.

If in step 418, the TA 104 determines that bits have changed value during transmission, the bearer channel 202 cannot support the VPSTN process 300. If this is the case, in step 420, the TA 104 sends a message packet telling the TA 102 to discontinue the secure call setup process 302. Upon receipt of the discontinue message, the TA 102 and management server 106 respond to the failure to conduct the call in secure mode (terminate call, allow call, provide warning tone or message, log the event, send notifications, etc.), in accordance with the security policy and as described in step 410.

If in step 418, the TA 104 determines that bit values have not changed during transmission, the line impairments test is repeated on the return DS-0 channel. In step 422, the TA 104 sends a "known" frame over the bearer channel 202 to the TA 102. The TA 102 compares the received "known" frame with the unmodified known frame and determines if bit values changed.

If in step 424, the TA 102 determines that bit values have changed during the transmission, the TA 102 discontinues the secure call setup process 302. The TA 102 and management server 106 respond to the failure to conduct the call in secure mode in the manner defined by the security policy (terminate call, allow call, provide warning tone or message, log the event, send notifications, etc.), as described in step 410. If the TA 102 determines that bit values have not changed, the TA 102 and 104 exchange the call session secret key in step 304.

Figure 5A:
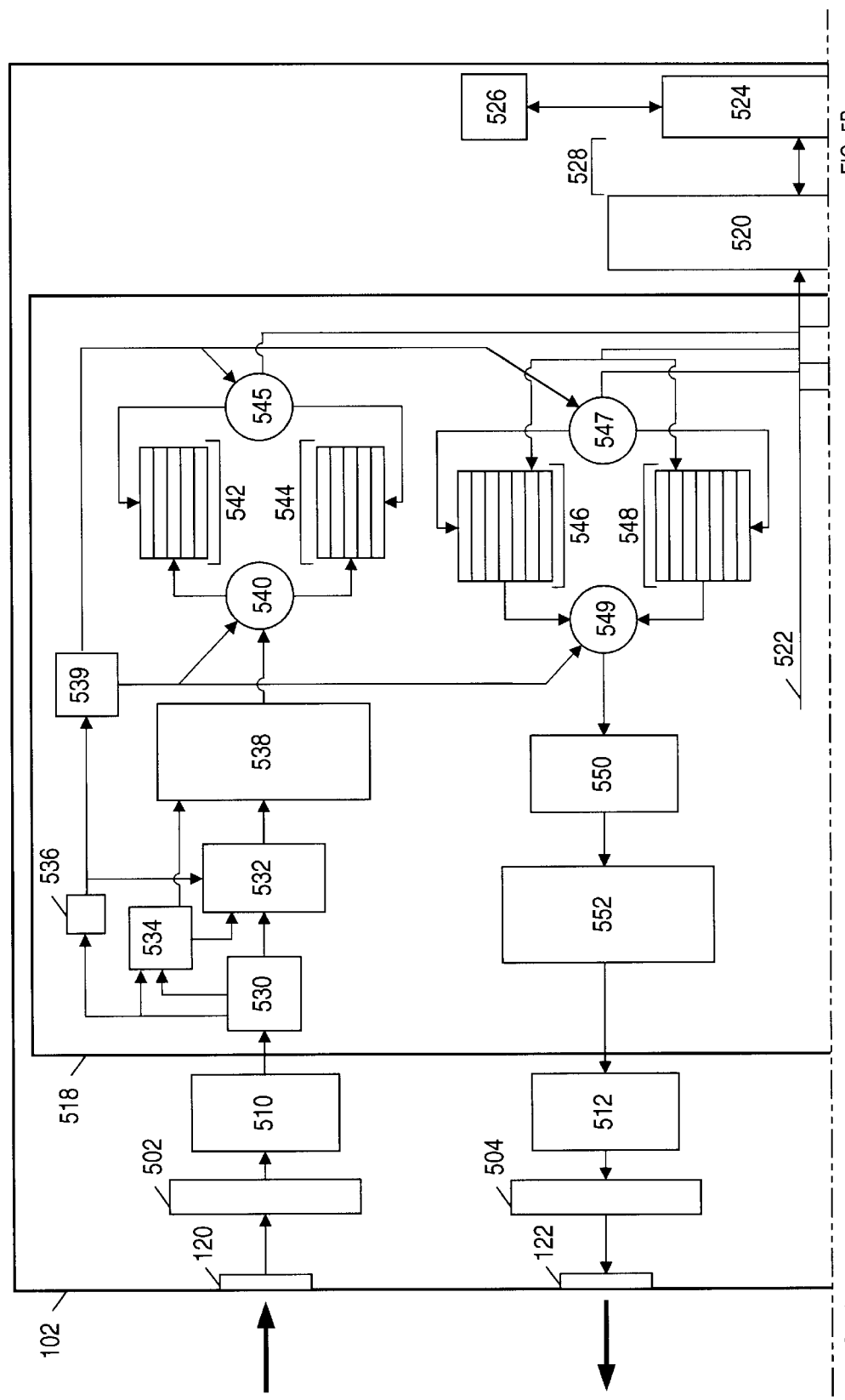
FIGS. 5A and 5B are a schematic block diagram of an exemplary telecom appliance.
Figure 5B:
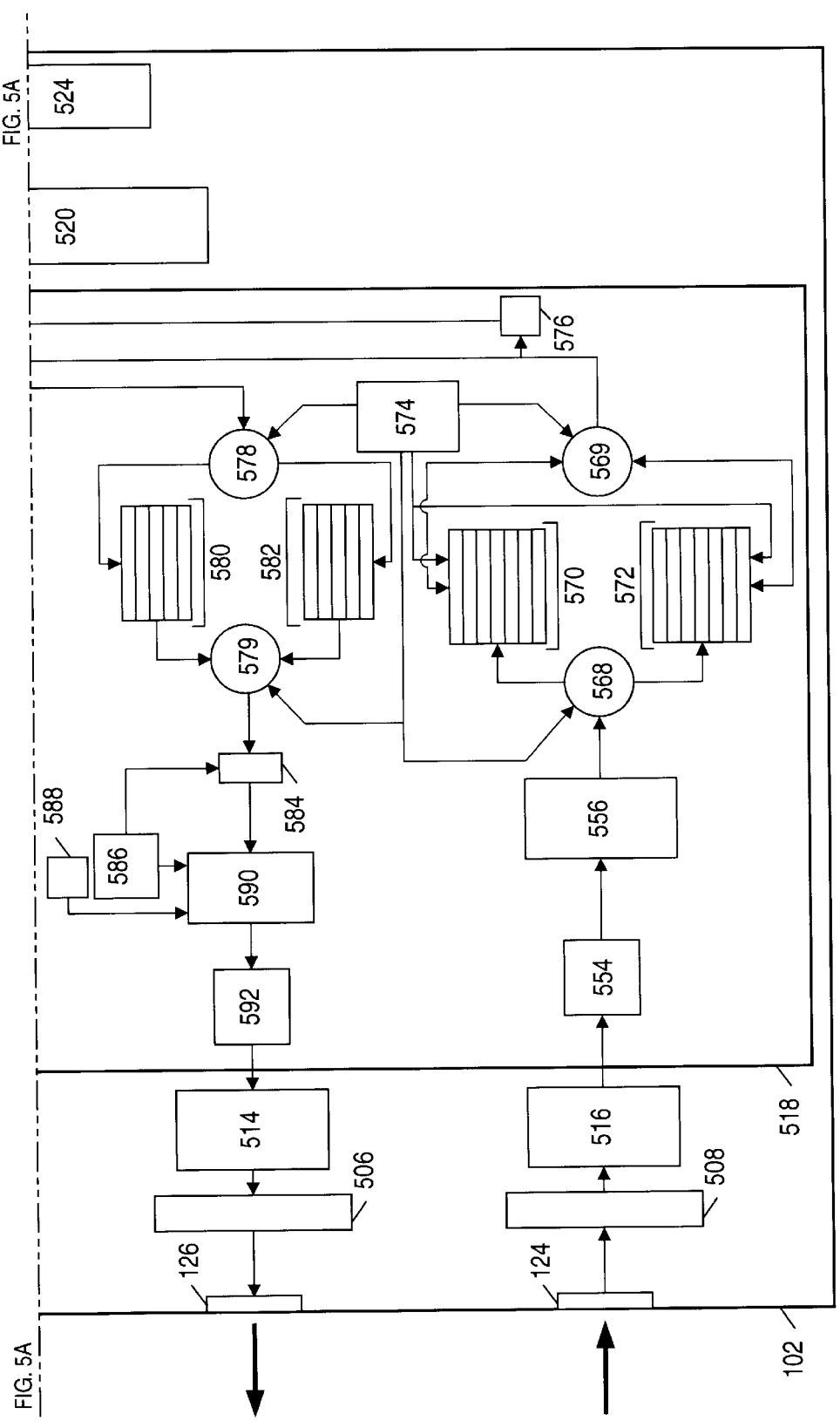

FIGS. 5A and 5B are a schematic block diagram of an exemplary telecom appliance. The TA 102 consists primarily of two input ports 120 and 124, two output ports 122 and 126, a pair of Line Interface Circuitry (LIC) 502 and 504 and framers 510 and 512 for the receive circuit, a pair of LIC 506, and 508 and framers 514 and 516 for the transmit circuit, a Field Programmable Gate Array (FPGA) 518 which contains the components for manipulating, compressing and decompressing the DS-0 channels, an encryption/decryption processor 520 which accesses the FPGA 518 via a memory bus 522, a Central Processing Unit (CPU) 524, CPU memory 526, and a PCI bus 528 which interconnects the encryption/decryption processor 520 and the CPU 524.

The FPGA 518 components make up a transmit circuit which receives non-secure DS-0 channels from the PBX 114, compresses and encrypts the data stream, and transmits the secure DS-0 channels to the PSTN 116, and a receive circuit which receives secure DS-0 channels from the PSTN 116, decrypts the data stream, and transmits the non-secure DS-0 channels to the PBX.

The FPGA transmit circuit includes a Serial-In Parallel-Out (SIPO) converter 530 which converts the bit stream received from the framer 510 to a word stream, a 32-channel ADPCM codec 532 which uses input from a 5-bit channel counter 534 and a ADPCM clock 536 to compress the 8-bit word stream to a 5-bit word stream, and a 1-to-32 demultiplexer 538, which separates the 5-bit ADPCM word stream into an individual word stream for each DS-0 channel (0–31).

Each FPGA 518 transmit circuit contains 32 arrays of channel-dedicated components, which includes a word counter 539, a switch 540, 545, 547, and 549, a SIPO shift register bank 542 and 544, a Parallel-In Serial-Out (PISO) shift register bank 546 and 548, and a PISO converter 550.

The word counter 539 counts the number of 5-bit ADPCM words passing through the switch 540. After every 64$^{th}$ word, the word counter causes the switch 540 and the switch 545 to change the direction of data flow between the pair of SIPO shift register banks 542 and 544. The encryption/decryption processor 520 accesses the data in one of the pair of SIPO shift register banks 542 or 544, depending on the position of the switch 545. The switch 545 allows one bank to fill while the encryption/decryption processor 520 processes the data already in the other bank. Simultaneously, the word counter causes the switch 547, and 549 to change the direction of data flow between a pair of PISO shift register banks 546 and 548. The encryption/decryption processor 520 deposits the encrypted data in one of the pair of PISO shift register banks 546 or 548, depending on the position of the switch 547. The switch 547 allows one bank to fill while the other bank empties through the switch 549, into the PISO converter 550. The 32 channels converge at a multiplexer 552, which uses time-division-multiplexing (TDM) to create a single bit stream.

The FPGA 518 receive circuit includes a SIPO converter 554 which converts the bit stream received from the framer 516 to a word stream, a 1-to-32 demultiplexer 556 which separates the 8-bit encrypted word stream into an individual encrypted word stream for each DS-0 channel (0 through 31).

Each FPGA 518 receive circuit contains 32 arrays of channel-dedicated components, which includes a Binary Pattern Correlator (BPC) 574, First-In First-Out (FIFO) buffer 576, a switch 568, 569, 578, and 579, a SIPO shift register bank 570 and 572, and a PISO shift register bank 580 and 582.

The BPC 574 determines if the SIPO shift register bank 570 or 572 contains a complete encryption packet, and when the bank is full, the BPC 574 causes the switch 568 and the switch 569 to change the direction of data flow between the pair of SIPO shift register banks 570 and 572. The encryption/decryption processor 520 accesses the data in one of the pair of SIPO shift register banks 570 or 572, depending on the position of the switch 569. The switch 569 allows one bank to fill while the encryption/decryption processor 520 processes the data already in the other bank and message data to be routed to the FIFO buffer 576. Simultaneously, BPC 574 causes the switch 578, and 579 to change the direction of data flow between a pair of PISO shift register banks 580 and 582. The encryption/decryption processor 520 deposits the decrypted data in one of the pair of PISO shift register banks 580 or 582, depending on the position of the switch 578. The switch 578 allows one bank to fill while the other bank empties through the switch 579, into a channel selector 584.

The 32 DS-0 channels converge at the channel selector 584 A channel counter 586 keeps track of the channel number for the channel selector 584 and an ADPCM clock 588 clocks the ADPCM core. The channel selector 584 multiplexes the separate word streams into a single word stream and routes it to a ADPCM codec 590. The ADPCM codec 590 converts the 5-bit word stream an 8-bit word stream.

Figure 6A:
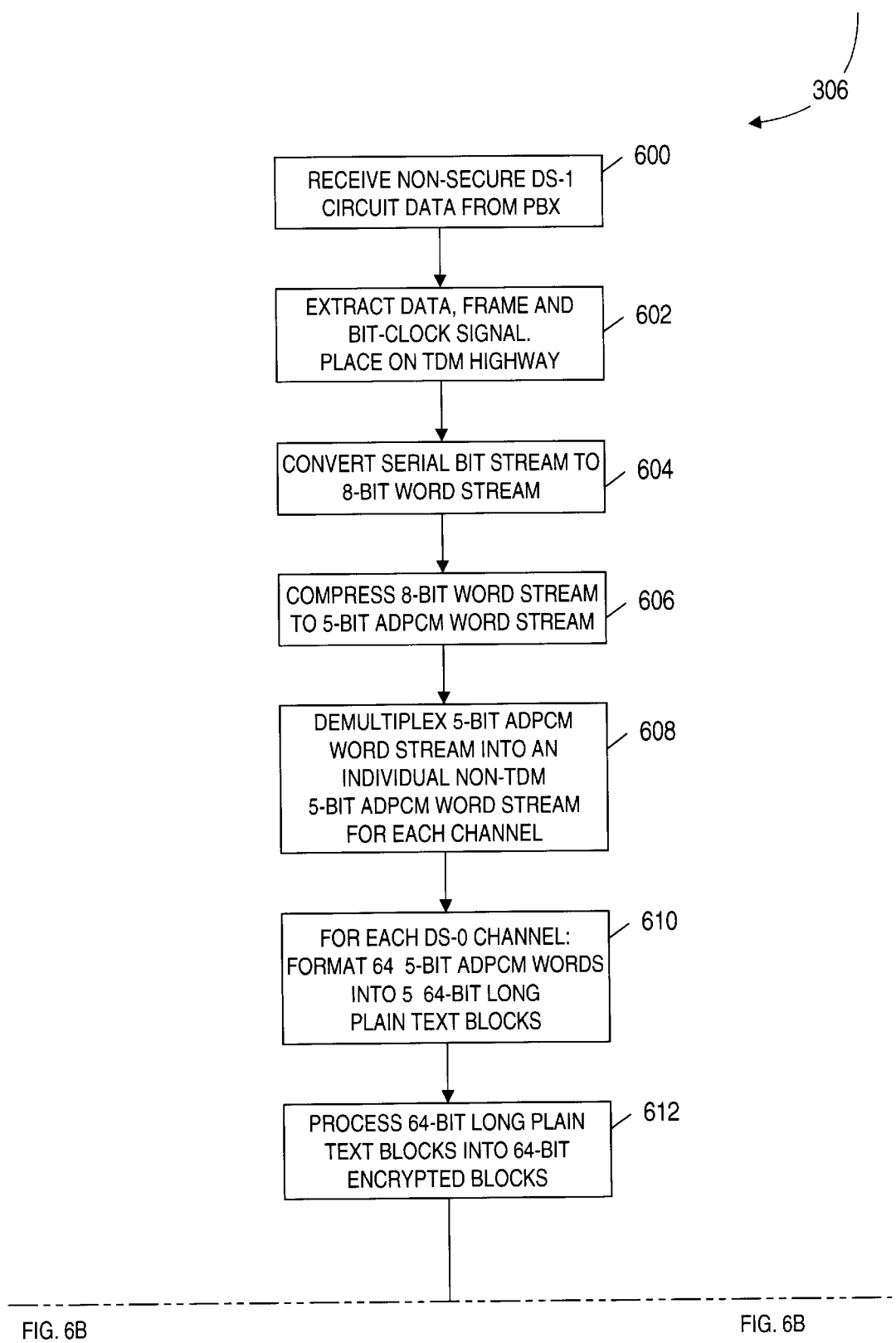
FIGS. 6A and 6B are a process flow diagram 208 illustrating the compression and encryption process.
Figure 6B:
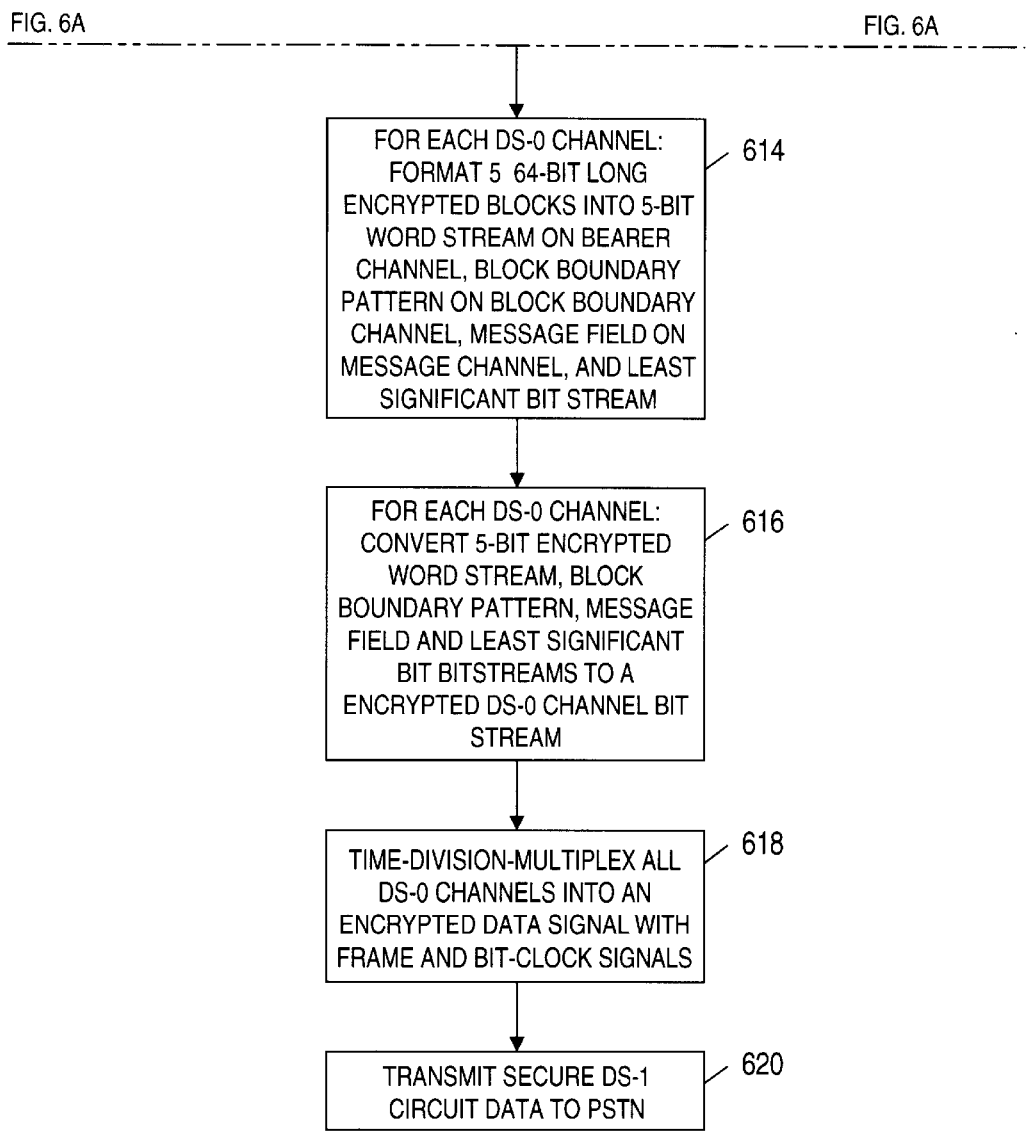

FIGS. 6A and 6B are a process flow diagram 208 illustrating the compression and encryption process 306, whereby a non-secure DS-1 is processed for secure transport. In step 600, upon entering the TA 102, the non-secure DS-1 is routed through the LIC 502, to the framer 510.

Figure 7:
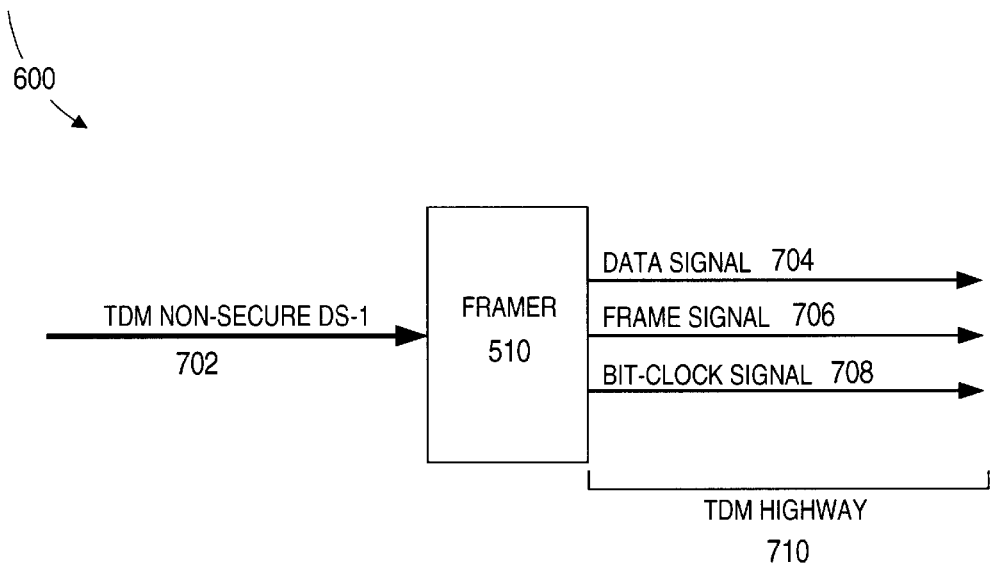
FIGS. 7–17 are diagrams of different portions of the system.

In step 602 (and shown in FIG. 7), the framer 510 receives a non-secure DS-1 702, extracts a data signal 704, frame signal 706 and bit-clock signal 708 from the serial data stream, and places the signals on a TDM highway 710. The TDM highway has 32 timeslot channels clocked at 2.048 Mbps, and consists of the data signal 704, frame signal 706 and bit-clock signal 708.

The data signal 704 carries the DS-0 data bit stream. The frame signal 706 indicates the beginning of the first 8-bit timeslot, sets the 8-bit timeslot boundaries and operates at 8 KHz. The bit-clock signal 708 synchronizes the DS-0 data bit stream and operates at 2.048 MHz. If the PBX-in link is a T1 or J1, 24 DS-0 channels are placed in timeslots 0 through 23, while the remaining 8 timeslots remain empty (set to some value). If the PBX-in link is an E1, the 30 DS-0 channels are placed in their respective timeslots, while timeslot 0 and 16 are reserved for signaling.

Figure 8:
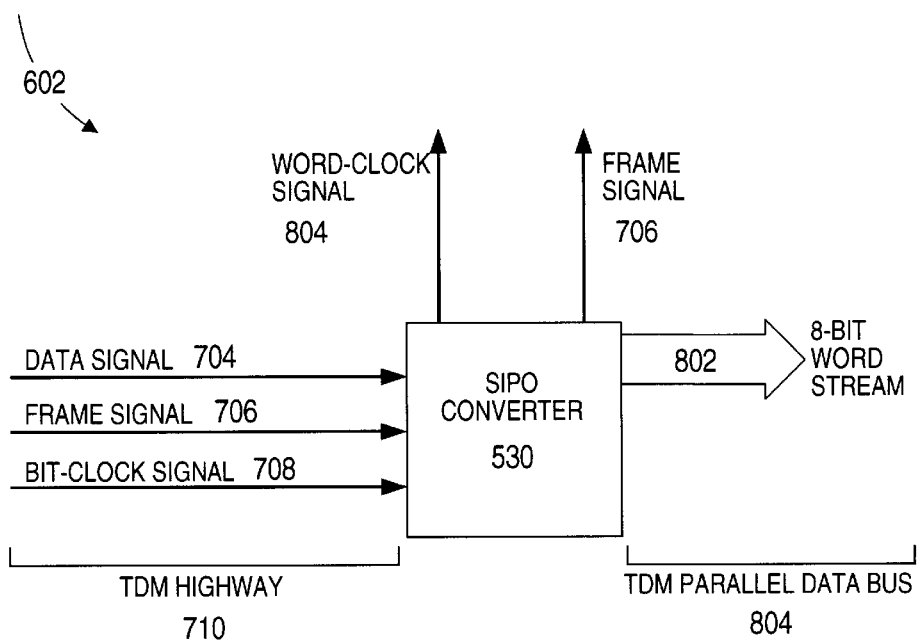

In step 604 (and shown in FIG. 8), the 32-channel TDM highway 710 routes the data, frame and bit-clock signals 706, 708, and 710 to the SIPO converter 530, which converts the serial bit stream to an 8-bit word stream 802. An 8-bit sample is output 256,000 times per second (one every 3.9 microseconds).

Figure 9:
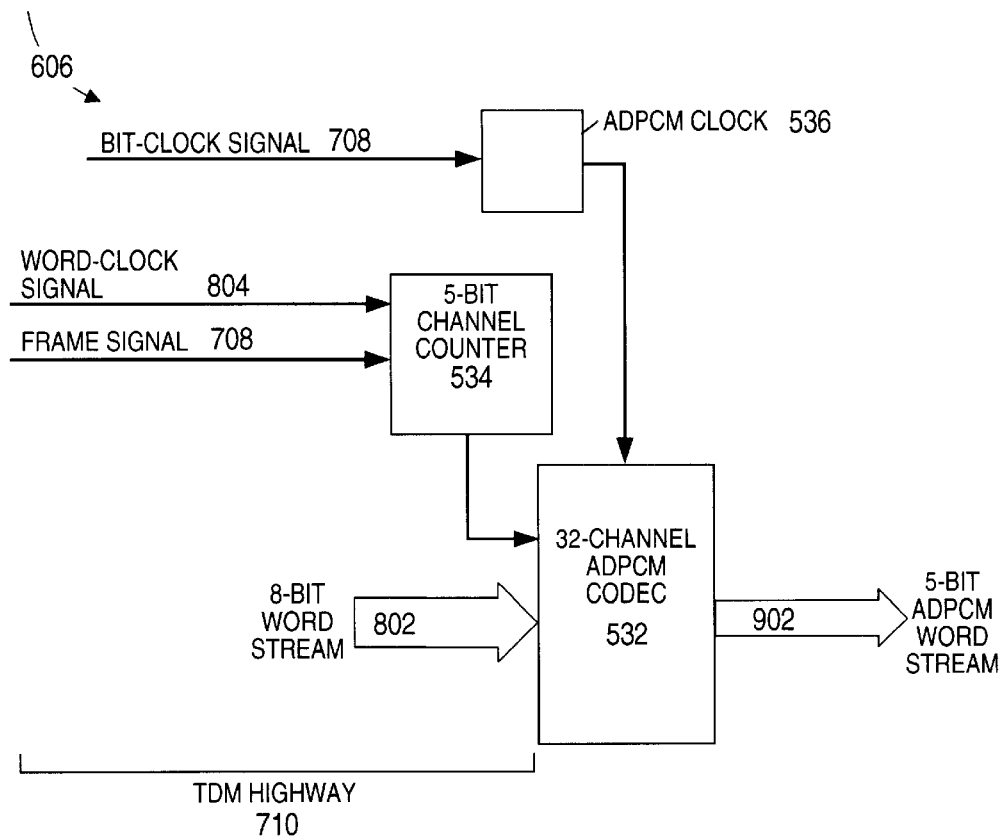

In step 606 (and shown in FIG. 9), the TDM highway 710 routes the 8-bit word stream 802 to the 32 channel ADPCM codec 532, the frame and word-clock signals 708 and 804 to the 5-bit channel counter 534, and bit-clock signal 708 to the ADPCM clock 536. The ADPCM codec 532 converts the 8-bit word stream 802 into a 5-bit ADPCM word stream 902. The 5-bit channel counter 534 keeps track of the channel number. The ADPCM clock 536 operates at a rate of 4.096 MHz, 16 times the algorithm processing rate of 256,000 bytes per second.

Figure 10:
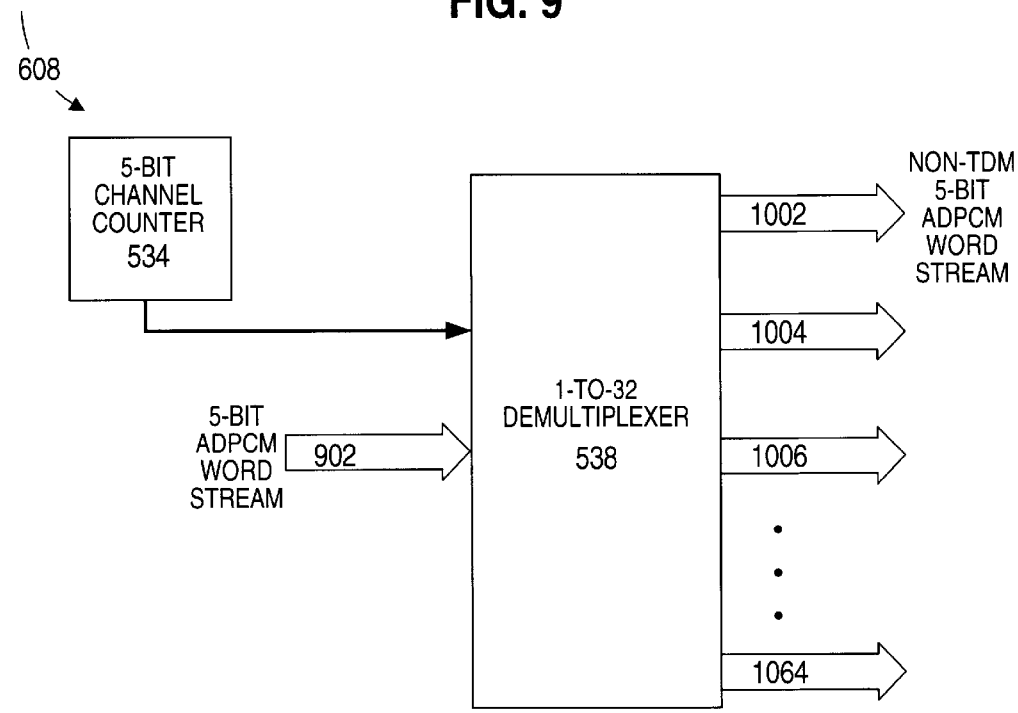

In step 608 (and shown in FIG. 10), the TDM highway 710 routes the 5-bit ADPCM word stream 902 and channel number information to the 1-to-32 demultiplexer 538, which separates the TDM 5-bit ADPCM word stream 902 into an individual non-TDM 5-bit ADPCM word stream 1002–1064 for each DS-0 channel (0 through 31).

Figure 11:
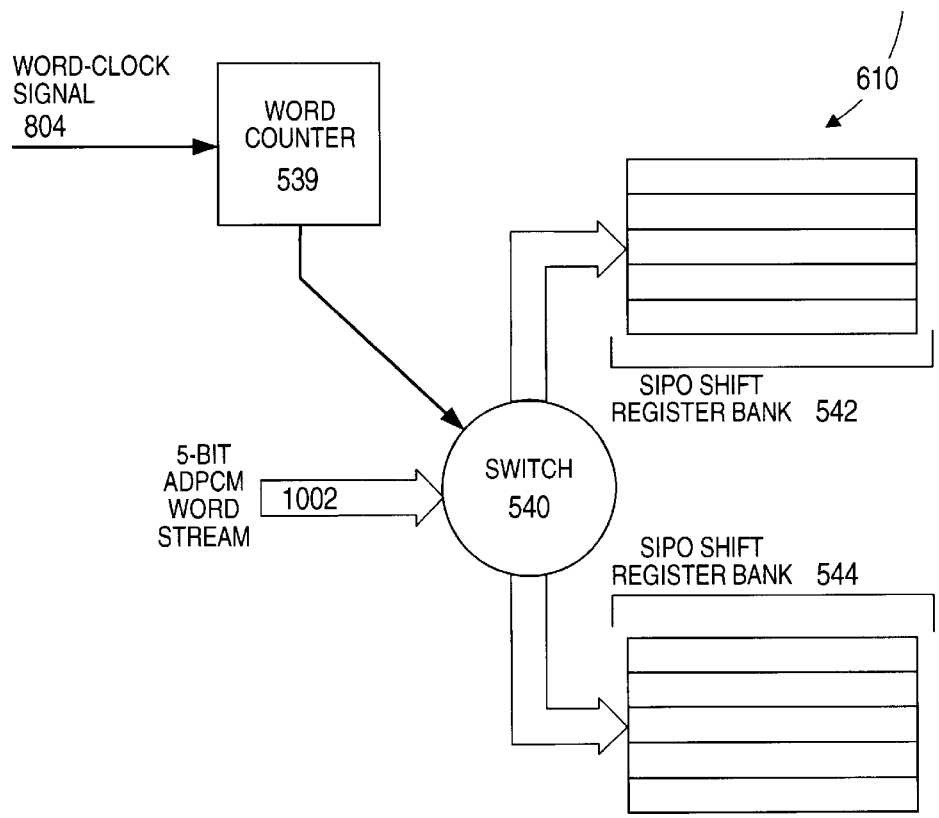

In step 610 (and shown in FIGS. 11 and 12), the 5-bit ADPCM word stream 1002 from channel n is routed through its own channel-dedicated switch 540, into one of a pair of channel-dedicated 64-bit SIPO shift register banks 542 and 544. Simultaneously, each of the 5-bit ADPCM word streams 1004–1064 are routed through their own channel-dedicated switch 540 to their own channel-dedicated 64-bit SIPO shift register banks 542 and 544.

The word counter 539 receives the word-clock signal 804 and counts the number of 5-bit ADPCM words. The word counter 529 causes the switch 540 to change the direction of data flow, switching between the channel-dedicated SIPO shift register banks 542 and 544 after every 64th word. The switch 540 is switched synchronously with the switches 545, 547, and 549 by the word counter 539. The five 64-bit SIPO shift registers 1202–1210 in the first SIPO shift register bank 542 fills with 64 words before switch 540 moves and the second SIPO shift register bank 544 begins to fill. The encryption/decryption processor 520 processes the first bank while the second bank fills. The 64-bit SIPO shift registers bank 542 or 544 load with 64 5-bit ADPCM words every 8 milliseconds (8,000/64=125 times per second).

Figure 12:
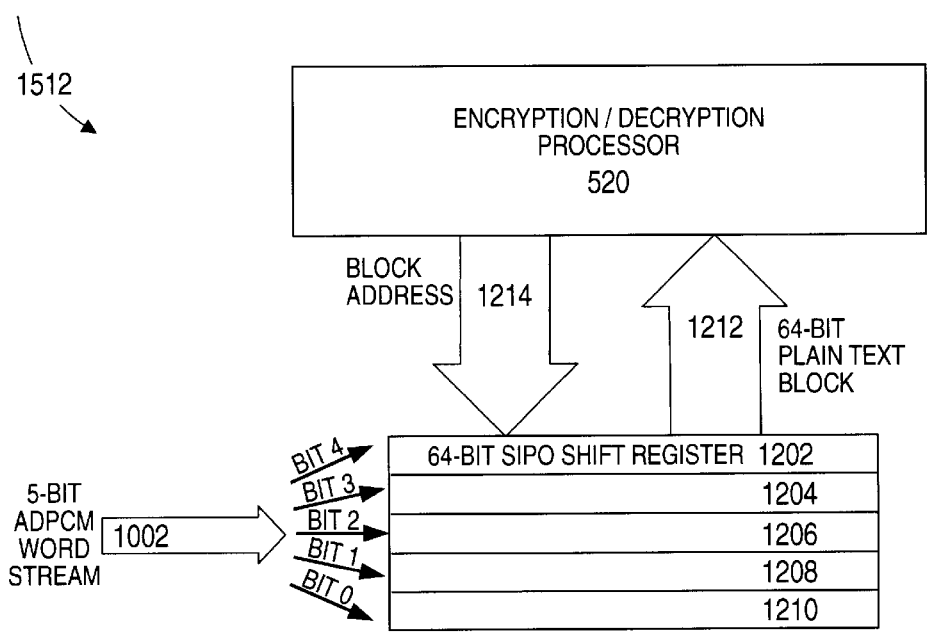

As shown in FIG. 12, each SIPO shift register bank 542 and 544 contains five 64-bit SIPO shift registers 1202–1210. Each of the five SIPO shift registers in a bank is dedicated to one of the five bits in the 5-bit ADPCM word stream 1002. The SIPO shift register 1202 receives bit 4, the MSB. The SIPO shift register 1204–1208 receives bits 31. The SIPO shift register 1210 receives bit 0, the LSB.

The 64-bit SIPO shift registers 1202–1210 allow the data to be formatted into a 64-bit plaintext block 1212, required by the encryption/decryption processor 520 for the encryption algorithm. Given that there are 32 channels and each channel has two banks of five 64-bit SIPO shift registers 1202–1210, this equals a total of 320 (32×2×5) SIPO shift registers. The parallel output ports for each SIPO shift register is mapped in the memory space of the encryption processor 520. The block address 1214 for each SIPO shift register is mapped into an address space of 2560 (320×8) bytes in the encryption/decryption processor 520 memory map. Any of the SIPO shift registers can be randomly accessed in the same manner as a RAM array by the encryption/decryption processor 520 and are read-only memory to the encryption/decryption processor 520.

Figure 13:
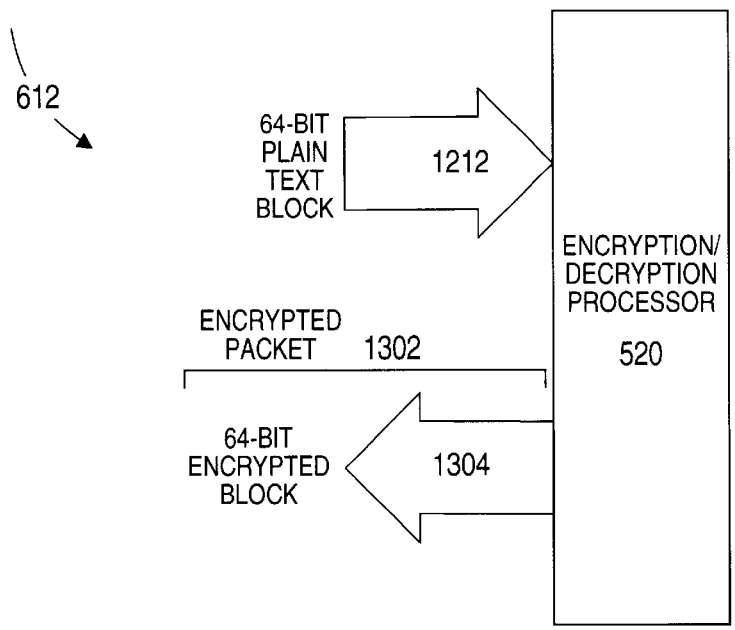

When the word counter 539 causes the switch 540 to change direction of data flow after the 64$^{th}$ word enters the SIPO shift register bank 542, as described previously in step 610, the switch 545 also moves to change direction of data flow. In step 612 (and shown in FIGS. 5A and 13), the switch 545 allows the encryption/decryption processor 520 access to process the 64-bit plaintext block 1212 from each of the five 64-bit SIPO shift registers 1202–1210 within 8 milliseconds of the bank being filled. The output encrypted packet 1302 is 8 milliseconds (⅛₂₅ of a second) in length and includes five 64-bit cyphertext (encrypted) blocks 1304.

It is understood that the encryption/decryption processor 520 processes 625 (5×125) 64-bit plaintext blocks 1212 per second for each DS-0 channel that requires encryption. If all the DS-0 channels in a T1 or J1 require secure communication, the encryption/decryption processor 520 processes 15,000 (24×625) 64-bit plaintext blocks 1212 per second. This rate means the encryption/decryption processor 520 processes the single 64-bit plaintext block 1212 in less than 66.7 microseconds. If all the DS-0 channels in an E1 require secure communication the encryption processor 520 processes 18,750 (30×5×125) 64-bit plaintext blocks 1212 per second. This rate means the encryption processor 520 processes the single 64-bit plaintext block 1212 in less than 53.3 microseconds. Additionally, if the encryption processor 520 is handling four E1 spans, and every DS-0 must be secured, the processor handles 75,000 (4×18,750) 64-bit plaintext blocks 1212 per second, equal to a block every 13.3 microseconds.

Figure 14:
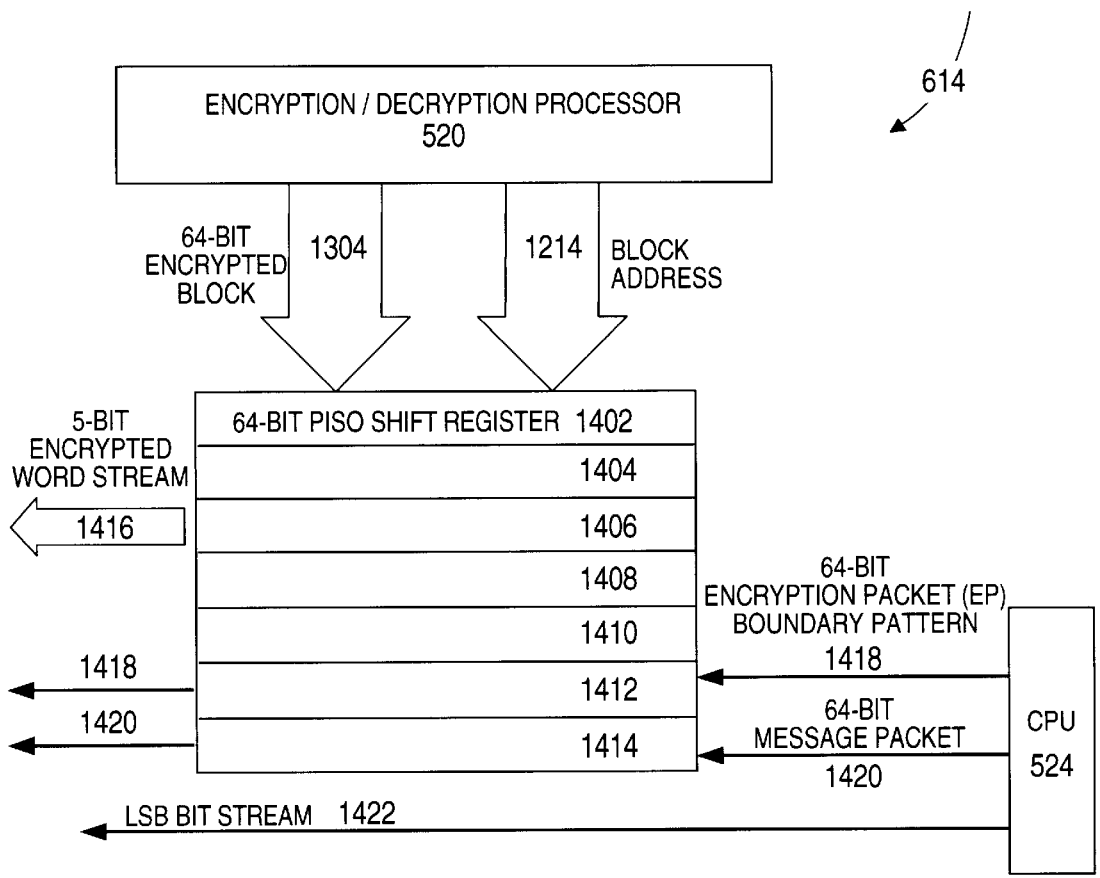

In step 614 (and shown in FIGS. 5A and 14), the switch 547 directs the data flow from the encryption/decryption processor 520 that loads the five 64-bit cyphertext (encrypted) blocks 1304 and block address 1214 into one of two channel-dedicated 64-bit PISO shift register banks 546 or 548. Each PISO shift register bank 546 or 548 is made up of seven PISO shift registers 1402–1414. Five of the seven PISO shift registers in each bank, specifically the PISO shift registers 1402–1410, are assigned to hold a 64-bit encrypted block 1304 in a one-to-one association with the five SIPO shift registers 1202–1210 previously mentioned with reference to step 610. The 5-bit encrypted word stream 1416 output from the five PISO shift registers 1402–1410 will be carried on the bearer channel 202.

The sixth register, the PISO shift register 1412, receives a 64-bit Encryption Packet (EP) boundary pattern 1418, which is uploaded from the CPU 524. The bit stream output from the PISO shift register 1412 is carried on the EP boundary channel 204. The EP boundary pattern 1418 is a constant 64-bit pattern that uses the BPC 574 to perform the encryption packet boundary function. The EP boundary pattern 1418 may be set to even or odd parity of the five bearer channels bits. The blocking is accomplished by alternating between even and odd parity between successive blocks. Parity blocking provides the ability to determine bit errors in the bearer channel 202 and signal an alarm when an error is discovered.

The seventh register, the PISO shift register 1414, receives a 64-bit message packet 1420, which is also uploaded from the CPU 524. As previously discussed, messages are exchanged between the TA 102 and the TA 104 to setup a secure call, exchange and negotiate TA capabilities, exchange session secret keys, report errors, etc. The bit stream output from the PISO shift register 1414 is carried on the message channel 206.

An LSB serial bit stream 1422 is uploaded from the CPU 524. The LSB 208 is always set high in order to increase one's density on the DS-1 span.

Figure 15:
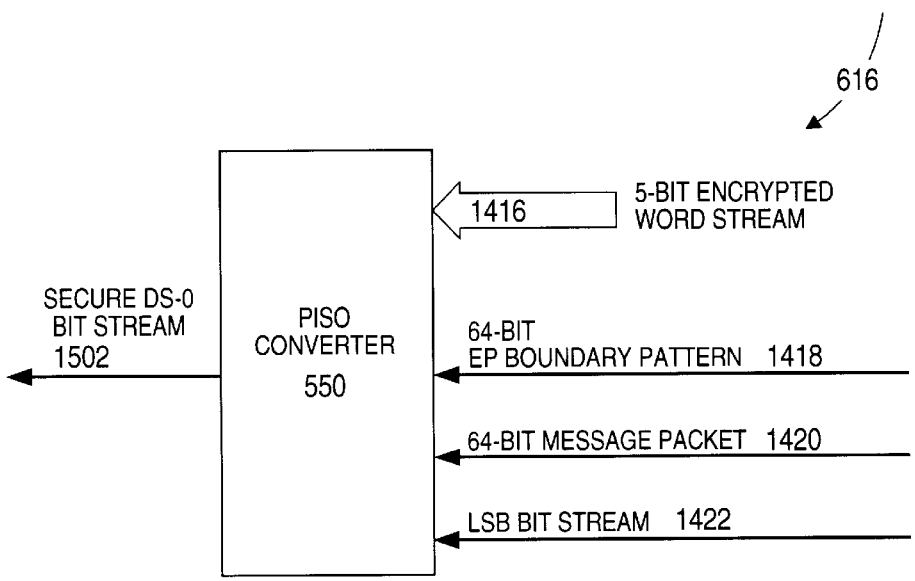

In step 616 (and shown in FIG. 15), the 5-bit encrypted word stream 1416, the 64-bit EP boundary pattern bit stream 1418, the 64-bit message packet bit stream 1420 and the LSB bit stream 1422 for each channel are routed to the channel-dedicated PISO converter 550 that outputs a serial stream of the VPSTN DS-0 sample 200, at 64,000 bps, which makes up a secure DS-0 bit stream 1502.

Figure 16:
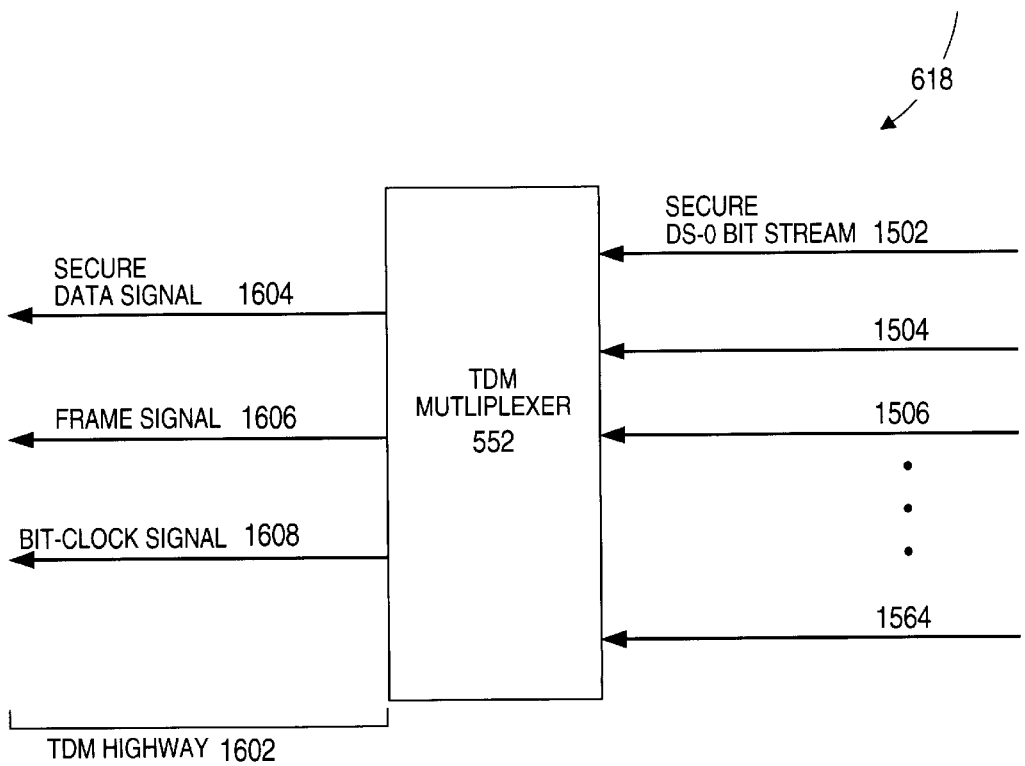

In step 618 (and shown in FIG. 16), each separate secure DS-0 bit stream 1502–1564 (channel 0–31) is routed to the TDM multiplexer 552 and multiplexed onto a single 2.048 Mbps TDM highway 1602 as a secure data signal 1604. The timeslot of each encrypted DS-0 channel on the outgoing TDM highway 1602 is the same timeslot used by that non-secure DS-0 channel on the incoming TDM highway 710 previously mentioned with reference to step 602. In addition to the secure data signal 1604, the TDM multiplexer 552 also places the frame signal 1606 and bit-clock signal 1608 on the TDM highway 1602.

Figure 17:
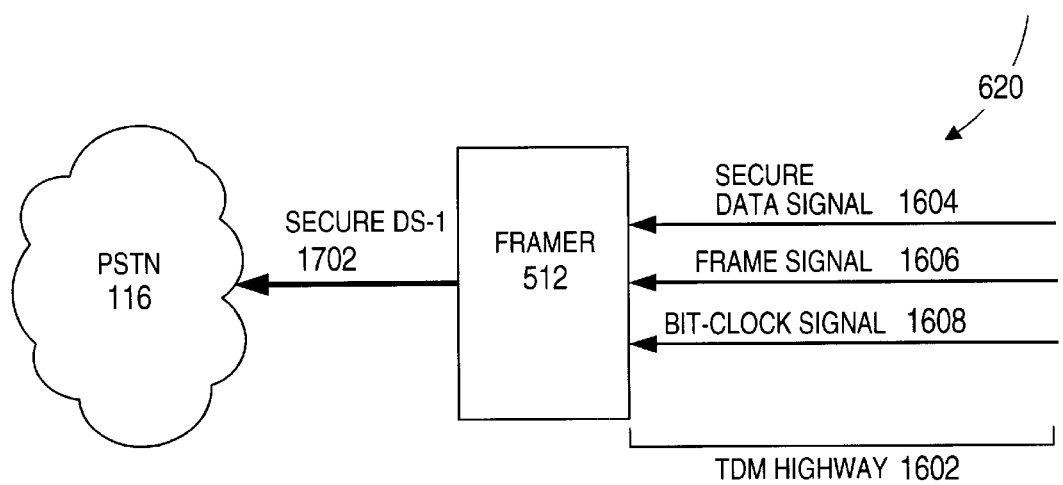

In step 620 (and shown in FIG. 17), the TDM highway 1602 routes the secure data, framing and bit-clock signals 1604, 1606 and 1608 to the framer 512. The PSTN-out port 122 transmits the secure DS-1 1702 to the PSTN 116, where each DS-0 is switched to one or more destinations. In most cases the 24 or 30 encrypted DS-0s in a T1, J1 or E1 span will be routed to multiple locations. However, for the following discussion related with FIG. 18 and the decryption and decompression process, assume that the entire DS-1 span is switched between the TA 102 and the TA 104.

Figure 18A:
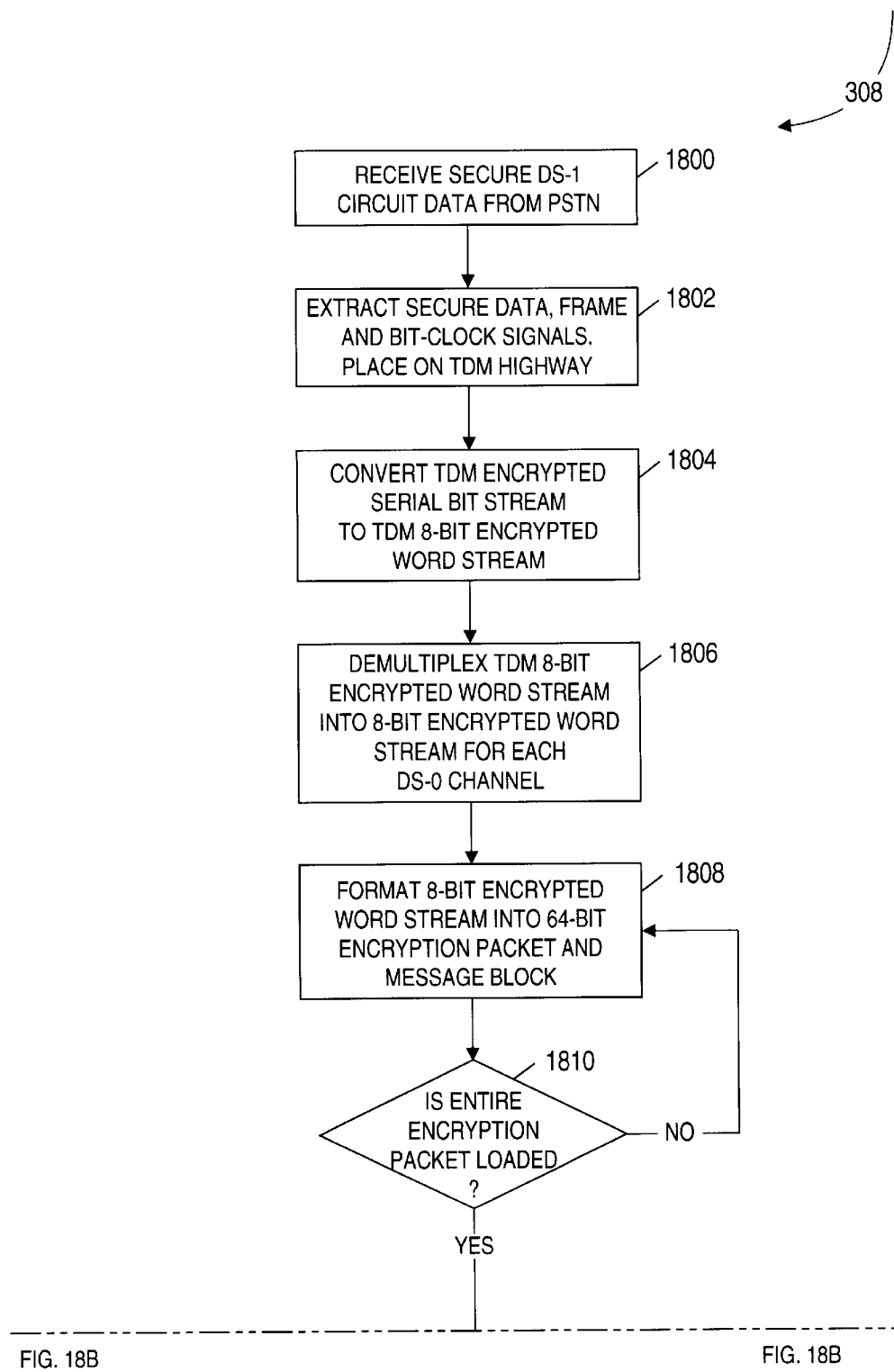
FIGS. 18A and 18B are flowcharts of a SIPO converter of the system.
Figure 18B:
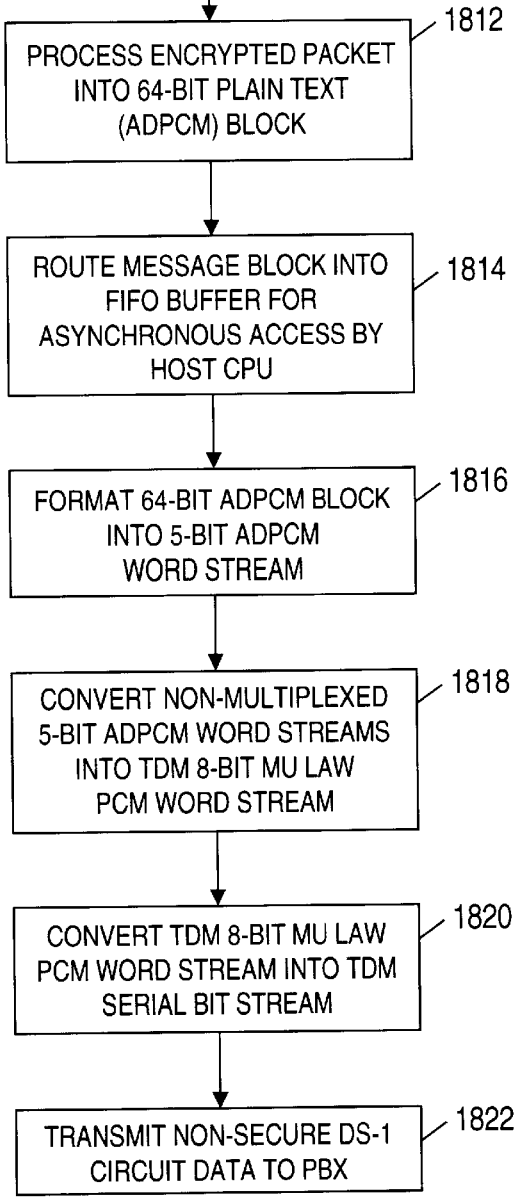

FIGS. 18A and 18B show a process flow diagram illustrating the decryption and decompression process 308, whereby secure DS-0 channels are restored to their original non-secure state.

In step 1800, the TA 104 receives the secure DS-1 1702 from the PSTN 144 on the net-in port 128. Upon entering the TA 104, the secure DS-1 1702 is routed through the LIC 508 to the framer 516.

Figure 19:
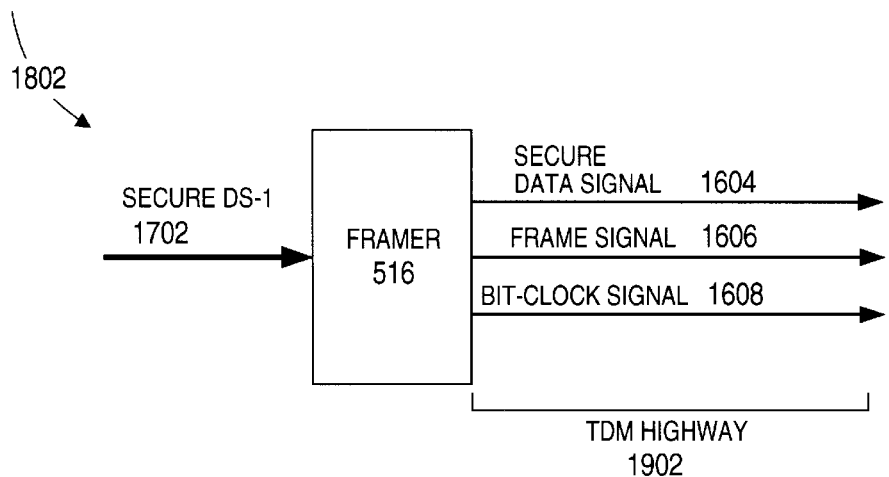

In step 1802 (and shown in FIG. 19), the framer 516 extracts the secure data signal 1604 (which carries the secure DS-0 bit stream 1502–1564), the frame signal 1606 and bit-clock signal 1608 from the serial data stream and places the signals on a TDM highway 1902. The TDM highway 1902 has 32 timeslot channels clocked at 2.048 Mbps.

Figure 20:
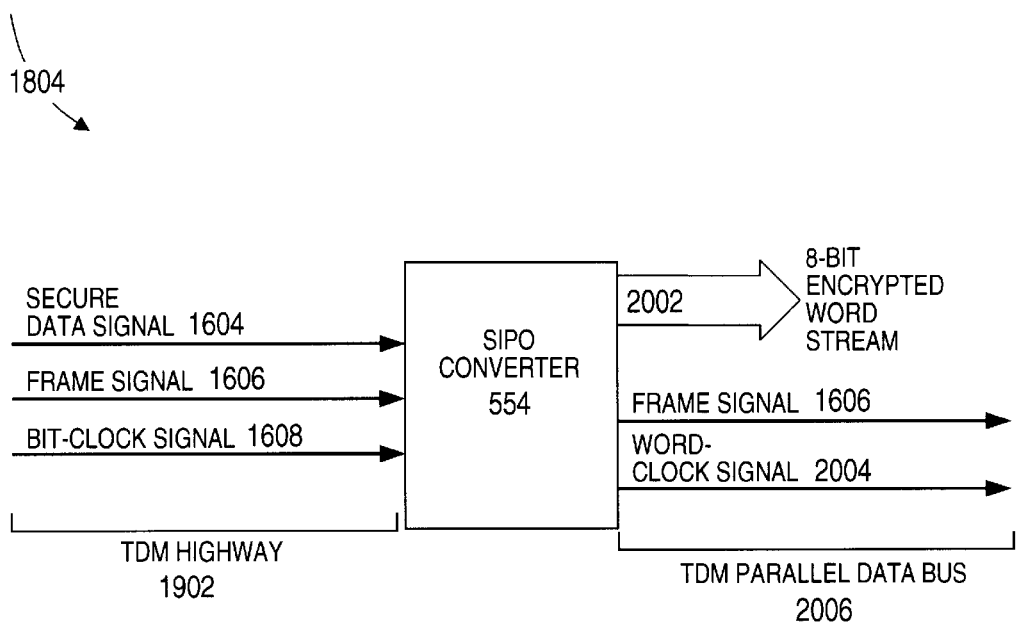

In step 1804 (and shown in FIG. 20), the 32-channel TDM highway 1902 routes the secure data, frame and bit-clock signals 1604, 1606, and 1608 to the SIPO converter 554, which converts the encrypted serial bit stream to an 8-bit encrypted word stream 2002. The 8-bit encrypted word stream 2002 is comprised of the 8-bit VPSTN DS-0 sample 200 which is output 256,000 times per second (one every 3.9 microseconds).

Figure 21:
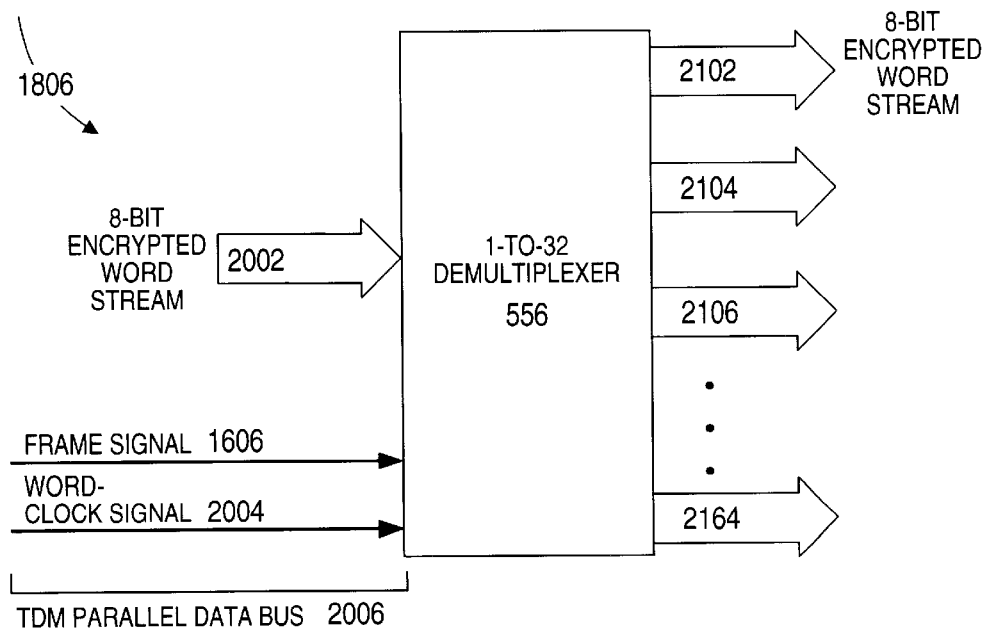

In step 1806 (and shown in FIG. 21), the TDM highway 1902 routes the 8-bit encrypted word stream 2002, frame signal 1606 and word-clock signal 2004 to the 1-to-32 demultiplexer 556. The 1-to-32 demultiplexer 556 separates the 32-TDM 8-bit encrypted word stream 2002 into an individual non-TDM 8-bit encrypted word stream 2102–2164 for each DS-0 channel (0 through 31).

Figure 22:
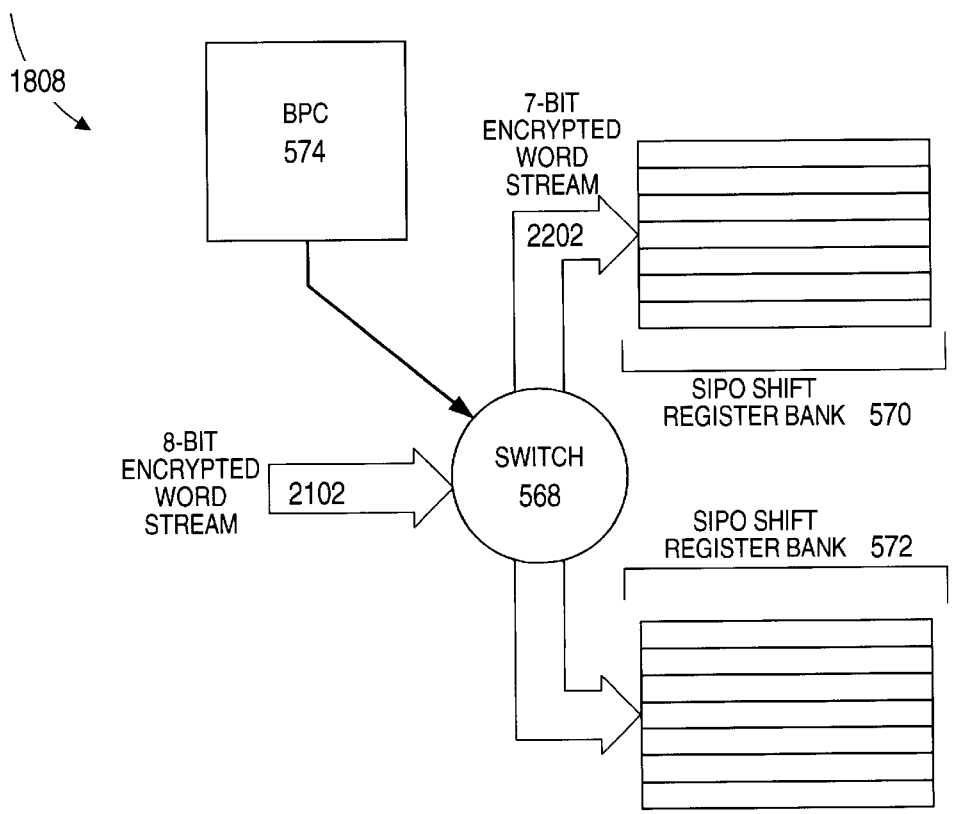

In step 1808 (and shown in FIGS. 22 and 23), the 8-bit encrypted word stream 2102 for channel n is routed through its own channel-dedicated switch 568. The LSB 208 of the 8-bit encrypted word stream 2102 is discarded. Simultaneously, each of the 8-bit encrypted word stream 2104–2164 are routed thorough their own channel-dedicated switch 568 to their own channel-dedicated SIPO shift register bank 570 or 572. The switch 568 directs data flow of a resulting 7-bit encrypted word stream 2202 into one of a pair of channel-dedicated 64-bit SIPO shift register bank 570 or 572. The switch 568 is switched synchronously with the switches 569, 578 and 579 by the BPC 574.

Figure 23:
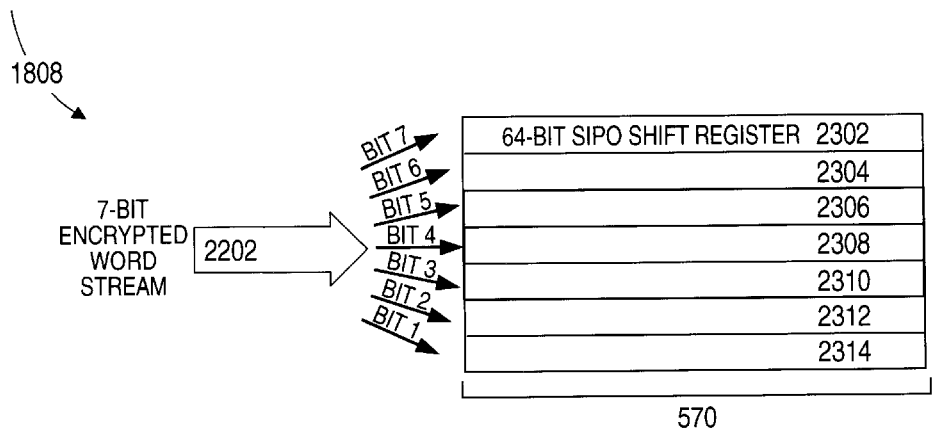

As shown in FIG. 23, each SIPO shift register bank 570 and 572 contains seven 64-bit SIPO shift registers 2302–2314. Each of the seven SIPO shift registers in a bank is dedicated to one of the seven bits in the 7-bit encrypted word stream 2202. The SIPO shift register 2302–2310 receives bit 7-bit 3 respectively, the contents of the bearer channel 202. The SIPO shift register 2312 receives bit 2, the contents of the EP boundary channel 204. The SIPO shift register 2314 receives bit 1, the contents of the message channel 206.

The 64-bit SIPO shift register 2302–2314 allow the 7-bit encrypted word stream 2202 to be formatted into the five 64-bit encrypted blocks 1304 for the encryption/decryption processor 520. Given that there are 32 channels and each channel has two banks of seven 64-bit SIPO shift registers 2302–2314, this equals a total of 488 (32×2×7) SIPO shift registers. The serial bit-position streams are clocked into the serial-inputs of the 64-bit SIPO shift registers 2302–2314.

Figure 24:
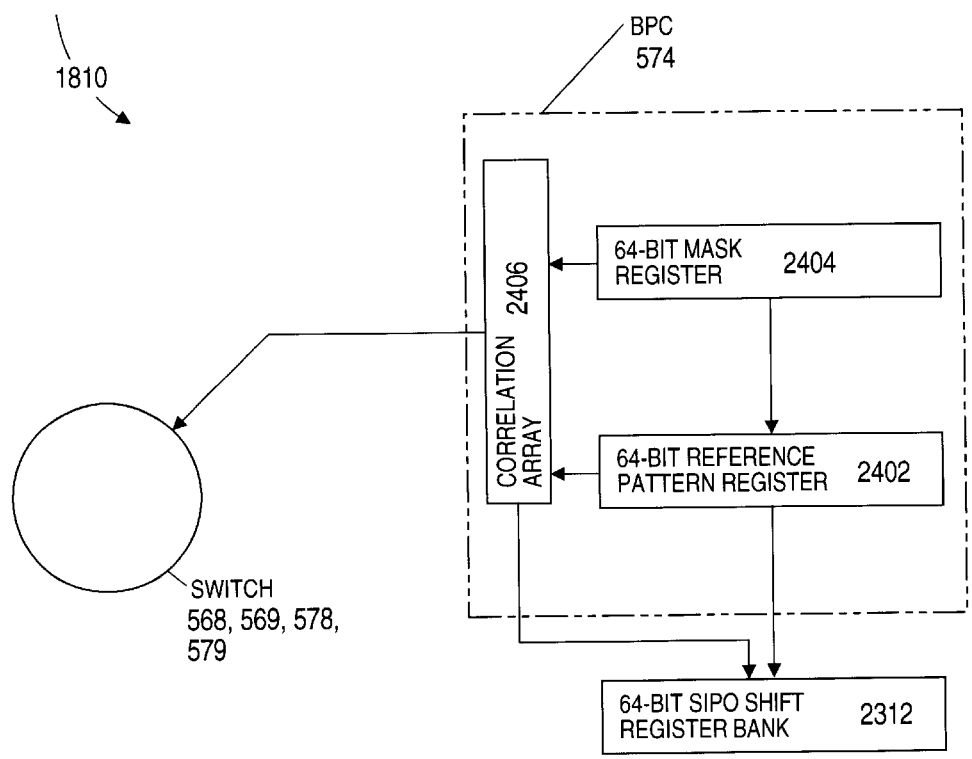

In step 1810 (and shown in FIG. 24), the BPC 574 accesses the 64-bit block in the SIPO shift register 2312 and uses it in a correlation process to detect the boundaries of the encryption packet 1302, thereby verifying that all five of the 64-bit encrypted blocks 1304 are fully loaded into the 64-bit SIPO shift register bank 570.

The BPC 574 is a digital correlator that includes the 64-bit SIPO shift register 2312, a 64-bit reference pattern register 2402, a 64-bit mask register 2404 and a correlation array 2406. To determine the number of matches in the 64-bit SIPO shift register 2312 data stream, the BPC 574 compares the data in the SIPO shift register 2312 with the digital pattern in the 64-bit reference pattern register 2402 on every clock rising edge. The 64-bit mask register 2404 allows certain bits within the SIPO shift register 2312 data stream to be either exact matches with the reference pattern, or to be considered as inconsequential. The number of matches is calculated on each rising bit-clock, and the correlation sum is compared to a programmable threshold. The threshold determines the probability of detection and the false alarm rate. The 64-bit pattern and mask registers 2402 and 2404 are memory mapped in the encryption/decryption processor 520 memory address space.

Continuing with step 1810, when the BPC 574 determines that the current content of the 64-bit SIPO shift register 2312 indicates that the 64-bit SIPO shift register bank holds the complete encryption packet 1302, the BPC 574 causes the switches 568 569, 578, and 579 to synchronously change the direction of data flow between the 64-bit SIPO shift register bank 570 and 572 and the PISO shift register bank 580 and 582 respectively. When the switch 568 moves, the second SIPO shift register bank 572 begins filling. When the switch 569 moves, the encryption/decryption processor 520 has access to process the encryption packet 1302 that just completed filling the SIPO shift register bank 570. In this way, the first 64-bit SIPO shift register bank 570 fills before the second 64-bit SIPO shift register bank 572 begins filling, and the encryption/decryption processor 520 processes the encryption packet 1302 in the first bank while the second bank fills. The 64-bit SIPO shift registers bank 570 or 572 fills with the encryption packet 1302 every 8 milliseconds (8,000/64=125 times per second).

Figure 25:
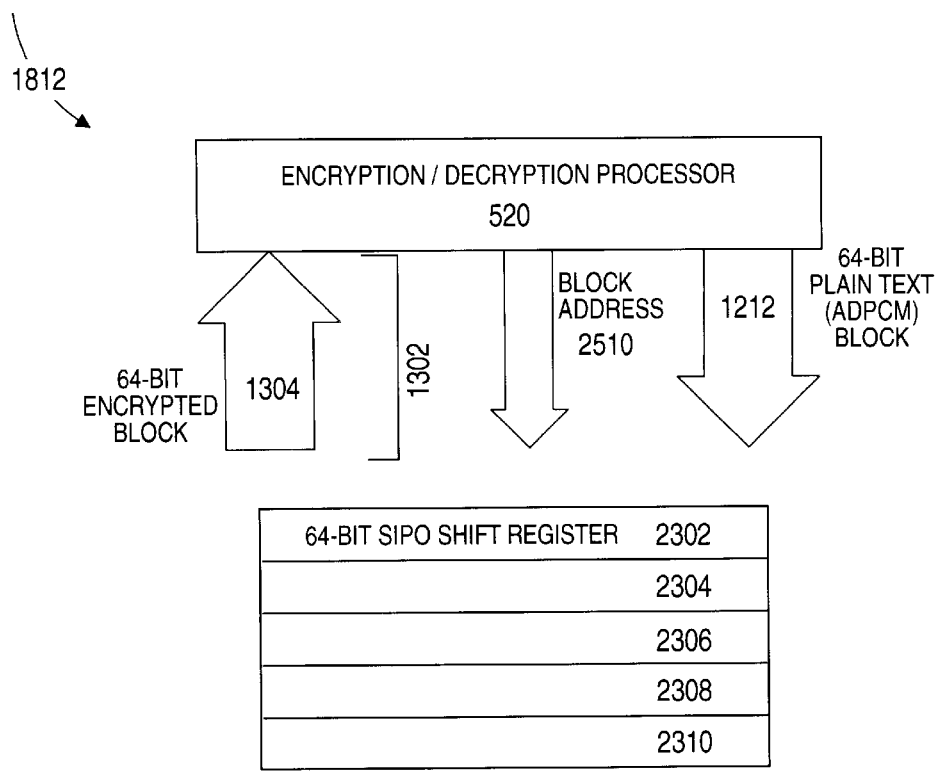

In step 1812 (and shown in FIG. 25), the encryption/decryption processor 520 decrypts the five 64-bit blocks 1304 (encryption packet 1302) contained in the five 64-bit SIPO shift registers 2302–2310, thereby restoring the five 64-bit plaintext (ADPCM) blocks 1212. The parallel output ports for each of the 488 SIPO shift registers is mapped in the memory space of the encryption/decryption processor 520. The block address 2510 requires 3584 (448×8) bytes in the memory map. Any of the SIPO shift registers can be randomly accessed in the same manner as a RAM array by the encryption/decryption processor 520. The 64-bit SIPO shift registers 2302–2310 are read-only memory to the encryption/decryption processor 520.

Figure 26:
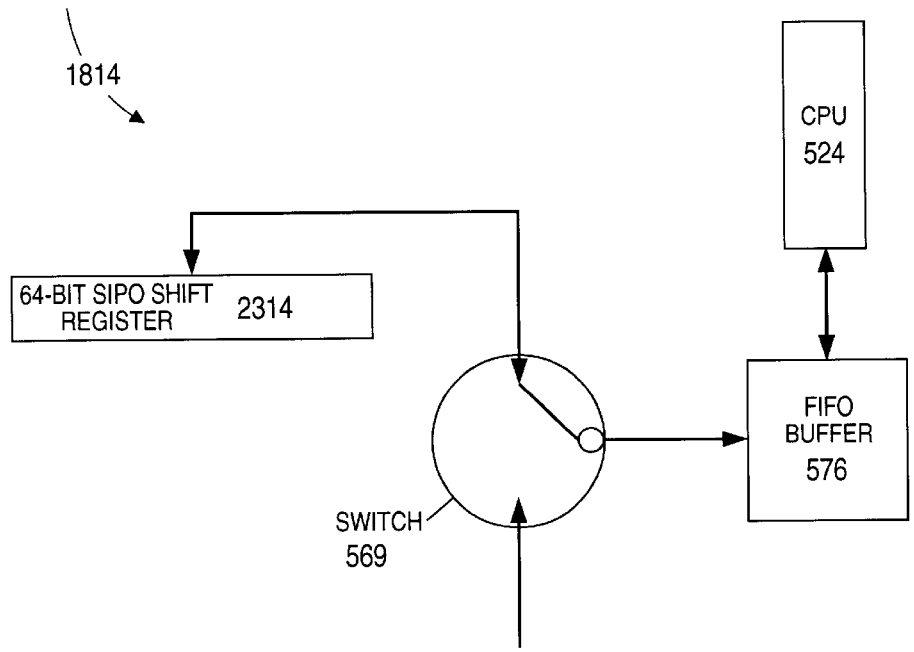

In step 1814 (and shown in FIG. 26) the data stream in the 64-bit SIPO shift register 2314 loads into a first-in first-out (FIFO) memory buffer 576 when the BPC 574 causes the switch 569 to change direction as previously mentioned with reference to step 1810. The CPU 524 asynchronously reads the messages carried on the message channel 206.

Figure 27:
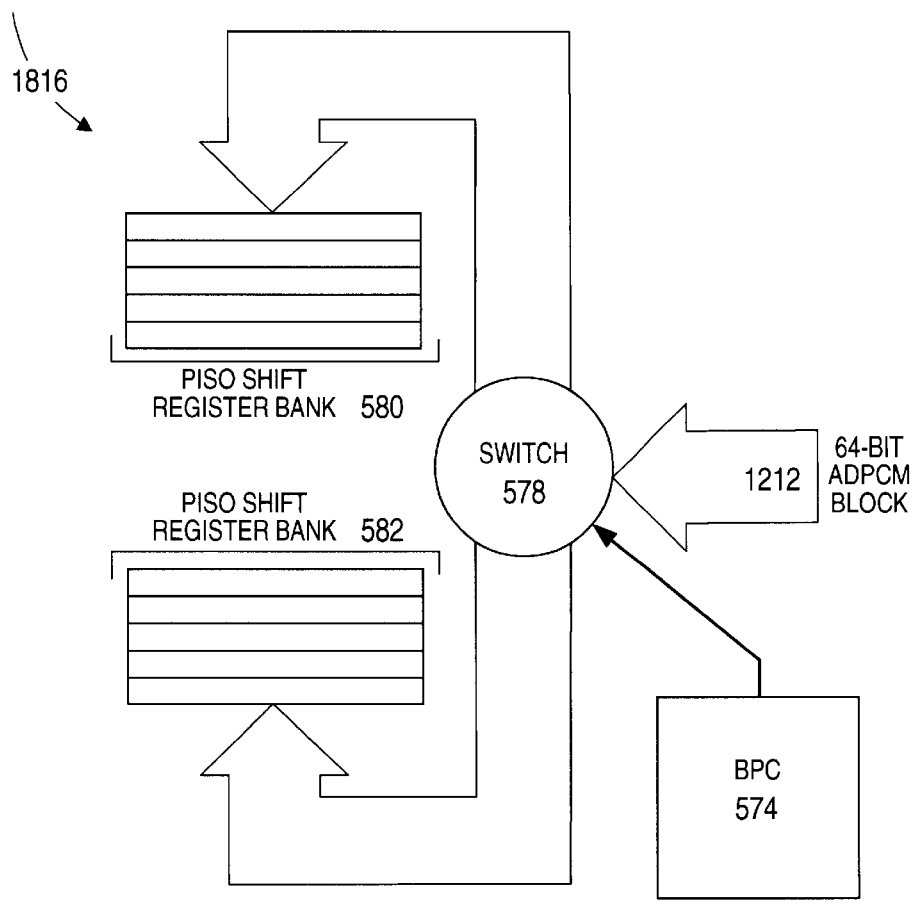
Figure 28:
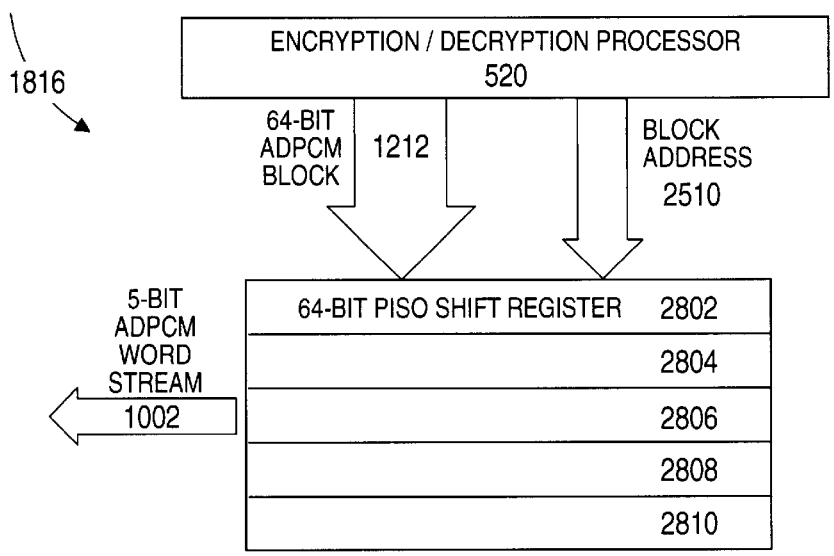

In step 1816 (and shown in FIGS. 27 and 28), the 64-bit ADPCM blocks 1212 and block address 2800 output from the encryption/decryption processor 722 are routed through the channel-dedicated switch 578, which directs data flow into one of a pair of channel-dedicated 64-bit PISO shift register banks 580 or 582. Each PISO shift register bank 580 and 582 is made up of five PISO shift registers 2802–2810, which fill with 64-bit ADPCM blocks 1212 and output a 5-bit ADPCM word stream 1002.

Figure 29:
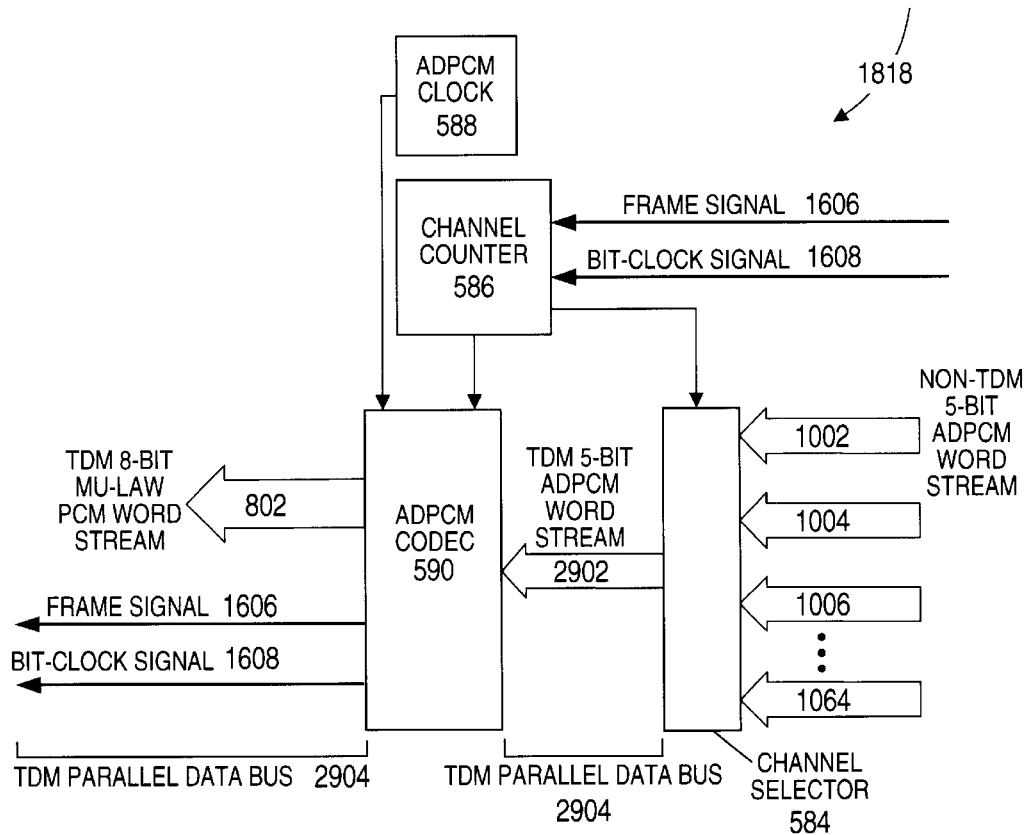

In step 1818 (and shown in FIG. 29) the 5-bit ADPCM word stream 1002–1064 from each DS-0 channel (0–31) is routed to the channel selector 584. The channel counter 586 receives the frame signal 1606 and bit-clock signal 1608 and keeps track of the channel number for the channel selector 584. The channel selector 584 receives the 5-bit ADPCM word streams 1002–1064 and time-division-multiplexes the 5-bit ADPCM words from each channel into a TDM 5-bit ADPCM word stream 2902 and places it on a TDM highway 2904. The TDM highway 2904 routes the TDM 5-bit ADPCM word stream 2902 to the ADPCM codec 590. The ADPCM codec 590 receives input from the ADPCM clock 588 and converts the TDM 5-bit ADPCM word stream 2904 to the TDM 8-bit mu-law PCM word stream 802.

Figure 30:
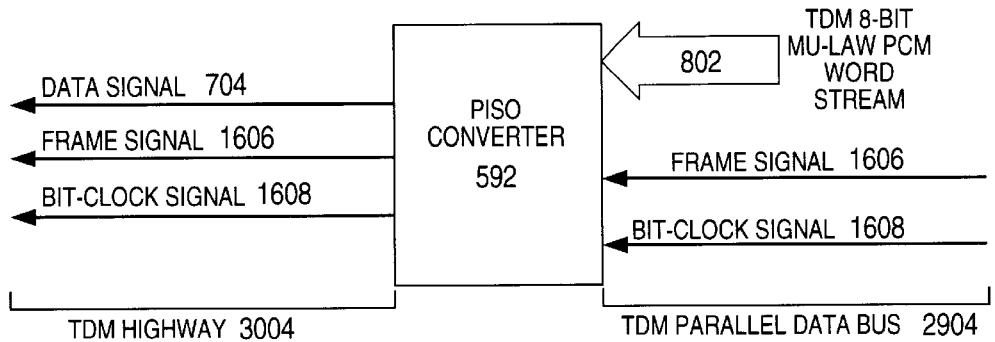

In step 1820 (and shown in FIG. 30), the TDM highway 2904 routes the TDM 8-bit mu-law PCM word stream 802, frame signal 1606 and bit-clock signal 1608 to the PISO converter 592. The PISO converter 592 places the output data signal 704, frame signal 1606 and bit-clock signal 1608 on the TDM highway 2904.

Figure 31:
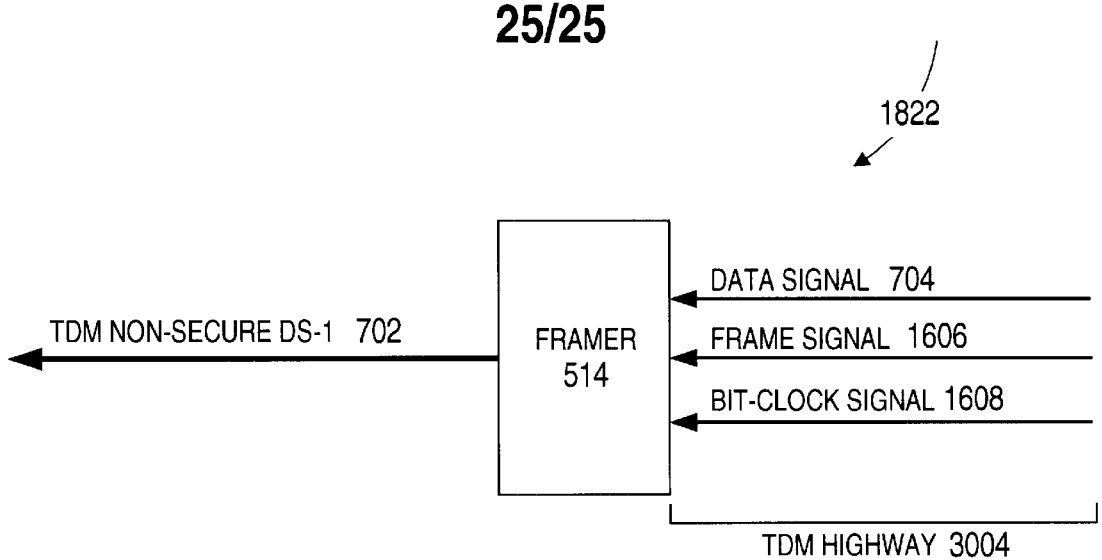

In step 1822 (and shown in FIG. 31), the TDM highway 2904 routes the data signal 704, frame signal 1606 and bit-clock signal 1608 to the framer 514. The PBX-out port 130 transmits the non-secure DS-1 702 to the PBX 118.

The embodiments shown herein are intended to illustrate rather than to limit the invention, it being appreciated that variations may be made without departing from the spirit of the scope of the invention. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A virtual private switched telecommunications network system for providing encrypted transport of a call across a public switched telephone network from a first enterprise location to a second enterprise location, said network system being located between one or more end-user stations within the first enterprise location and one or more end-user stations within the second enterprise location, said network system comprising:

at least one security rule in a database at the first enterprise location, said at least one security rule specifying at least one action to be performed based on at least one attribute of an incoming or an outgoing call to/from the first enterprise location;

at least one security rule in a database at the second enterprise location, said at least one security rule specifying at least one action to be performed based on at least one attribute of an incoming or outgoing call to/from the second enterprise location; and at least one first telephony appliance associated with said database at the first enterprise location within the first enterprise location;

at least one second telephony appliance associated with said database at the second enterprise location within the second enterprise location;

said at least one first telephony appliance and said at least one second telephony appliance including means for determining said at least one attribute of an incoming or outgoing call, said at least one attribute of the incoming or outgoing call being selected from a group including: call direction, call source number, call destination number, call type, call date, call time, and call duration, said call type attribute being defined as one of voice, fax, or data transfer (modem); and said at least one first telephony appliance and said at least one second telephony appliance each further including means for individually performing said at least one action specified in the at least one security rule defined in its associated database, said at least one action being based upon said at least one determined attribute of the incoming or outgoing call, said at least one action being selected from a group including: allowing the call, denying the call, conducting the call in encrypted mode, sending a tone, sending a message, logging the call, generating a report, and providing an alert.

2. The network system as defined in claim 1 wherein said action of conducting the call in encrypted mode may be activated or de-activated at any time during the call.

3. The network system as defined in claim 1 further including means for continuously exchanging control and status messages between the first enterprise location and the second enterprise location while conducting the call in the encrypted mode.

4. The network system as defined in claim 1 wherein said action of providing an alert includes at one least alert from a group including: electronic mail notification, pager dialing, console messaging, and a Simple Network Management Protocol (SNMP) trap.

5. The network system as defined in claim 1 further including the action of generating a report includes generating a post event analysis report or a batch analysis report.

6. The network system as defined in claim 1 wherein said action of conducting the call in encrypted mode is provided without encrypting actions being performed by either the calling party using the one or more end-user stations within the first enterprise location or the called party using the one or more end-user stations within the second enterprise location.

7. The network system as defined in claim 1 wherein each of said first telephony appliance and said second telephony appliance may perform said at least one action on calls to or from one or more end-user stations.

8. A method for providing encrypted transport of a call across a public switched telephone network from/to a first enterprise location and from/to a second enterprise location, the method being implemented between one or more end-user stations and the public switched telephone network at both the first and second enterprise locations, said method including the steps of:

defining at least one security rule applicable within the first enterprise location;

defining at least one security rule applicable within the second enterprise location;

said at least one security rule applicable within the first enterprise location specifying at least one action to be performed on the call based on at least one attribute of the call;

said at least one security rule applicable within the second enterprise location specifying at least one action to be performed on the call based on at least one attribute of the call;

detecting and analyzing the call to determine said at least one attribute of the call, said at least one attribute of the call being selected from a group including: call direction, call source number, call destination number, call type, call date, call time, and call duration, and said call type attribute being defined as one of voice, fax, or data transfer (modem); and performing said at least one action on the incoming or outgoing call at the first enterprise location and the second enterprise location based upon said at least one attribute of the call, said at least one action being specified in said at least one security rule and being selected from a group including: allowing the call, denying the call, conducting the call in encrypted mode, sending a tone, sending a message, logging the call, generating a report, and providing an alert.

9. The method as defined in claim 8 wherein said action of providing an alert includes at one least alert selected from a group including: electronic mail notification, pager dialing, console messaging and a Simple Network Management Protocol (SNMP) trap.

10. The method as defined in claim 8 wherein said action of conducting the call in encrypted mode includes continuously exchanging control and status messages between the first enterprise location and the second enterprise location while conducting the call in the encrypted mode.

11. The method as defined in claim 8 wherein said action of conducting the call in encrypted mode may be activated or de-activated at any time during the call.

12. The method as defined in claim 8 wherein said action of conducting the call in encrypted mode is provided without encrypting actions being performed by either the calling party using the one or more end-user stations within the first enterprise location or the called party using the one or more end-user stations within the second enterprise location.

13. The method as defined in claim 8 wherein said at least one action may be concurrently performed on calls to or from one or more end-user stations.

14. The method as defined in claim 8 wherein said action of generating a report includes generating a post event analysis report or a batch analysis report.

15. A method of providing encrypted transport of a call from a first geographically separate location, across a PSTN, to a second geographically separate location, the method comprising:

defining at least one rule applicable to one or more end-user stations located at the first geographically separate location, said at least one rule specifying one or more actions to be performed based upon at least one attribute of an incoming call to or an outgoing call from said one or more end-user stations located at the first geographically separate location;

defining at least one rule applicable to one or more end-user stations located at the second geographically separate location, said at least one rule specifying one or more actions to be performed based upon at least one attribute of an incoming call to or an outgoing call from said one or more end-user stations located at the second geographically separate location;

determining said at least one attribute of an incoming call to or an outgoing call from said one or more end-user stations located at the first geographically separate location;

determining said at least one attribute of an incoming call to or an outgoing call from said one or more end-user stations located at the second geographically separate location;

performing said one or more actions on the incoming call to or the outgoing call from said one or more end-user stations located at the first geographically separate location, in accordance with said at least one rule applicable to one or more end-user stations located at the first geographically separate location; and performing said one or more actions on the incoming call to or the outgoing call from said one or more end-user stations located at the second geographically separate location, in accordance with said at least one rule applicable to one or more end-user stations located at the second geographically separate location; and;

said at least one attribute of the incoming call to or the outgoing call from the one or more end-user stations is selected from a group including: call direction, call source number, call destination number, call type, call date, call time, and call duration, said call type attribute being defined as one of voice, fax, or data transfer; and wherein said one or more actions is selected from a group including: allowing the call, denying the call, conducting the call in encrypted mode, sending a tone, sending a message, logging the call, generating a report, and providing an alert.

16. The method as defined in claim 15 wherein said action of providing an alert includes at one least alert selected from a group including: electronic mail notification, pager dialing, console messaging and a Simple Network Management Protocol (SNMP) trap.

17. The method as defined in claim 15 wherein said action of conducting the call in encrypted mode includes continuously exchanging control and status messages between the first geographically separate location and the second geographically separate location concurrent with the conduct of the call.

18. The method as defined in claim 15 wherein said action of conducting the call in encrypted mode is provided without encrypting actions being performed by either the calling party using the one or more end-user stations within the first geographically separate location or the called party using the one or more end-user stations within the second geographically separate location.

19. The method as defined in claim 15 wherein said one or more actions may be concurrently performed on calls to or from one or more end-user stations.

20. The method as defined in claim 15 wherein said action of generating a report includes generating a post event analysis report or a batch analysis report.

\* \* \* \* \*